(12) United States Patent
Oh

(10) Patent No.: US 11,992,162 B2
(45) Date of Patent: May 28, 2024

(54) CONTAINER HAVING ATTACHABLE/DETACHABLE HANDLE

(71) Applicant: POKETDREAM INC., Gimpo-si (KR)

(72) Inventor: Kuen-Sik Oh, Seoul (KR)

(73) Assignee: POKETDREAM INC., Gimpo-si (KR)

( * ) Notice: Subject to any disclaimer, the term of this patent is extended or adjusted under 35 U.S.C. 154(b) by 328 days.

(21) Appl. No.: 17/309,905

(22) PCT Filed: Nov. 22, 2019

(86) PCT No.: PCT/KR2019/016080
§ 371 (c)(1),
(2) Date: Jun. 28, 2021

(87) PCT Pub. No.: WO2020/141726
PCT Pub. Date: Jul. 9, 2020

(65) Prior Publication Data
US 2022/0061591 A1    Mar. 3, 2022

(30) Foreign Application Priority Data

Dec. 31, 2018 (KR) .................. 10-2018-0173922

(51) Int. Cl.
A47J 45/07    (2006.01)
(52) U.S. Cl.
CPC .................... A47J 45/071 (2013.01)
(58) Field of Classification Search
CPC ......... A47J 45/071; A47J 45/072; A47J 45/07
See application file for complete search history.

(56) References Cited

FOREIGN PATENT DOCUMENTS

| CN | 101278811 A | 10/2008 |
|---|---|---|
| CN | 101700175 A | 5/2010 |
| CN | 108471912 A | 8/2018 |
| JP | 3062348 U | 10/1999 |
| JP | 2003-210340 A | 7/2003 |
| JP | 2010035652 | 2/2010 |
| JP | 5266425 B1 | 8/2013 |
| JP | 2013215390 A | 10/2013 |
| JP | 2015-514538 A | 5/2015 |
| KR | 20-0301372 Y1 | 1/2003 |
| KR | 20120005641 U | 8/2012 |
| KR | 10-1312368 B1 | 9/2013 |
| KR | 20140101165 A | 8/2014 |
| KR | 10-2015-0014401 | 2/2015 |

(Continued)

OTHER PUBLICATIONS

International Search Report and Written Opinion dated Jun. 4, 2020 in International Application No. PCT/KR2019/016080, in 11 pages. (English translation of ISR in 2 pages.).

(Continued)

Primary Examiner — Stephen J Castellano
(74) Attorney, Agent, or Firm — Knobbe, Martens, Olson & Bear, LLP

(57) ABSTRACT

This application relates to a container having an attachable/detachable handle. In one aspect, the container includes a fastening member having one side coupled to a container and having a fastening portion formed at the other side thereof that is opposite to the one side. The container may also include a detachable block member having a stopper member detachably coupled to the fastening portion of the fastening member. The container may further include a handle body to which the detachable block member is coupled.

21 Claims, 22 Drawing Sheets

(56) References Cited

FOREIGN PATENT DOCUMENTS

| KR | 10-1528452 B1 | 6/2015 |
| KR | 10-2015-0119784 A | 10/2015 |
| WO | WO 2007/032614 A1 | 3/2007 |
| WO | WO 2011/052859 A1 | 5/2011 |

OTHER PUBLICATIONS

Supplementary European Search Report in EP Application No. 19907174.7 dated Aug. 26, 2022.
Office Action in Indian Patent Application No. 202127034342 dated Apr. 13, 2022 in 7 pages.
Chinese Office Action dated Nov. 13, 2023 in Chinese Application No. 201980086765.2.
Office Action received in Chinese Application No. 201980086765.2 dated Mar. 22, 2024.

CONTAINER HAVING ATTACHABLE/DETACHABLE HANDLE

The present application is a U.S. national phase application under 35 U.S.C. § 371 of International Application No. PCT/KR2019/016080, filed on Nov. 22, 2019, which claims the benefit of Korean Patent Application No. 10-2018-0173922 filed on Dec. 31, 2018, in the Korean Intellectual Property Office, the entire disclosure of each of which is incorporated herein by reference.

TECHNICAL FIELD

The present disclosure relates to a container having an attachable/detachable handle, and more particularly, to a container having an attachable/detachable handle, which may prevent movement between the container and the handle.

BACKGROUND ART

Generally, a handle may be coupled to a container used for cooking various foods for convenience of use. That is, the handle attached to the container allows a user to cook while protecting the user from high heat even when heat is transferred to the container itself by a heating device such as a gas stove.

A handle of a traditional container is fixedly coupled to the container so that the container and the handle are firmly fixed. Thus, even if the user grabs the handle and cooks, the container does not move from the handle. Meanwhile, when a plurality of containers are stored, a handle portion of one container interferes with or collides with a body of another container, which has a risk of damage. In addition, such traditional containers occupy a lot of storage volume.

In order to solve the problem of the container having a fixed handle, a container having a handle provided detachably from the container is disclosed. However, in the case of the conventional container with an attachable/detachable handle, if the handle is coupled to the container, when the user holds the handle, the container moves, for example shakes, due to the clearance between the container and the handle. Due to such movement, it is uneasy and inconvenient for the user to cook, and also the risk of a safety accident of the user increases.

DISCLOSURE

Technical Problem

Therefore, the present disclosure is directed to providing a container having an attachable/detachable handle, which may prevent movement between the container and the handle by coupling the handle to the container without a clearance.

In addition, the present disclosure is directed to providing a container having an attachable/detachable handle in which the handle may be conveniently and easily attached to the container.

Technical Solution

In one aspect of the present disclosure, there is provided a container having an attachable/detachable handle, comprising: a fastening member having one side coupled to a container and having a fastening portion formed at the other side thereof that is opposite to the one side; a detachable block member having a stopper member detachably coupled to the fastening portion of the fastening member; and a handle body to which the detachable block member is coupled, wherein the stopper member includes: a moving shaft formed in a longitudinal direction and configured to be movable; and a head coupled to the moving shaft, wherein the head includes: a first portion coupled to the moving shaft; and a second portion coupled to the first portion and configured to be capable of contacting the fastening portion, wherein the head moves together with the moving shaft to contact the fastening portion.

Also, the second portion may be inclined based on the moving shaft, and the head may move along the inclined surface of the second portion in a state where the second portion of the head is in contact with the fastening portion, and then stop.

In addition, the second portion may be formed to be inclined downward rather than the moving shaft based on the moving shaft.

Also, the second portion of the head may move in contact with the fastening portion so that the head stops by contacting at least one of the detachable block member and the fastening member.

In addition, the head may include a third portion coupled to the second portion, and the second portion may be inclined based on the moving shaft, and the third portion may also be inclined based on the moving shaft.

Also, a first angle formed between the second portion and the moving shaft may be formed downward based on the moving shaft, and a second angle formed between the third portion and the moving shaft may be formed upward based on the moving shaft.

In addition, based on an acute angle, the first angle may be smaller than the second angle.

Also, the first portion and the moving shaft may be coupled to intersect each other.

In addition, the detachable block member may include a block body having a space in which the fastening member is inserted, the block body having a perforated hole formed therein; an elastic member inserted into the perforated hole of the block body; and a lever coupled to the stopper member, wherein the stopper member may be inserted into the perforated hole and coupled to the elastic member to receive an elastic force and be fastened to the fastening portion formed in the fastening member.

Also, the detachable block member may include a block body having a space in which the fastening member is inserted, the block body having a perforated hole formed therein; an elastic member coupled to the block body; and a lever coupled to the stopper member and the elastic member, and the stopper member may be inserted into the perforated hole and coupled to the lever to receive an elastic force from the elastic member coupled to the lever and be fastened to the fastening portion formed in the fastening member.

In addition, the perforated hole may be inclined on a virtual horizontal line orthogonal to a peripheral surface of the container, and the moving shaft is inserted along the inclined perforated hole.

Also, the fastening member may have an inclined portion, and the head may move along the inclined portion in contact with the inclined portion of the fastening member and then stop.

In addition, the head may move along the inclined portion in contact with the inclined portion of the fastening member and then stop by contacting at least one of the detachable block member and the fastening member.

Also, the head may include a third portion coupled to the second portion, and the head may contact the inclined portion at a connection point where the second portion and the third portion meets and be configured to move along the inclined portion of the fastening member in a state where the connection point is in contact with the inclined portion of the fastening member.

In addition, the head may include a fourth portion coupled to the first portion, and the head may move in a state where the fourth portion of the head is in contact with the detachable block member first, and the head may stop as the second portion of the head contacts the fastening portion.

Also, the head may include a fourth portion coupled to the first portion, the fastening member may include an inclined portion, and the head may move in a state where the fourth portion of the head is in contact with the detachable block member first, and the head may stop as another portion of the head contacts the inclined portion of the fastening member.

Meanwhile, in another aspect the present disclosure, there is provided a container having an attachable/detachable handle, comprising: a fastening member having a fastening portion formed at one side thereof and a coupling groove formed at the other side thereof that is opposite to the one side, the fastening member having a predetermined space formed between the one side and the other side, wherein the one side thereof having the fastening portion is fixedly coupled to a container; a detachable block member having a stopper member detachably coupled to the fastening portion of the fastening member; and a handle body to which the detachable block member is coupled, wherein the stopper member includes: a moving shaft formed in a longitudinal direction and configured to be movable; and a head coupled to the moving shaft, wherein the head includes: a first portion coupled to the moving shaft; and a second portion coupled to the first portion and configured to be capable of contacting the fastening portion, wherein the head moves together with the moving shaft to contact the fastening portion.

Also, the detachable block member may include a block body having a protrusion inserted into the space of the fastening member and having a perforated hole formed therein, the block body being coupled to the coupling groove; an elastic member inserted into the perforated hole of the block body; a stopper member inserted into the perforated hole and coupled to the elastic member to receive an elastic force and fastened to the fastening portion formed in the fastening member; and a lever coupled to the stopper member.

In addition, the coupling groove may be formed such that a separated gap thereof gradually increases from an upper side to a lower side.

Also, the protrusion may be formed to have a width gradually increasing from an upper side to a lower side to correspond to the coupling groove.

Advantageous Effects

Therefore, in the embodiments of the present disclosure, since the detachable block member is coupled to the fastening member without a clearance, it is possible to prevent movement between the container and the handle.

In addition, since the handle and the container may be coupled if the user just holds the handle and moves in a predetermined direction at a position close to the container, the handle may be conveniently and easily coupled to the container.

BEST MODE

Figure 1:
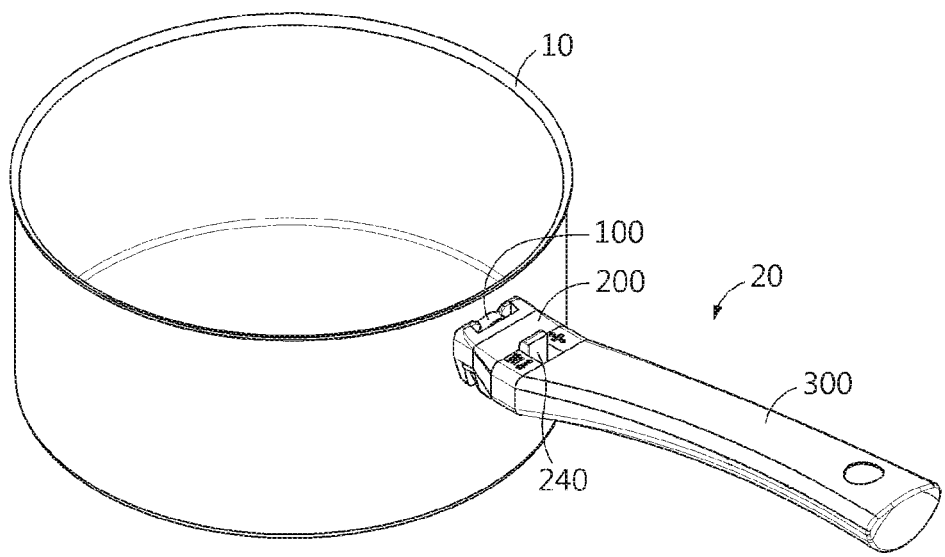
FIG. 1 is a perspective view showing an overall container having an attachable/detachable handle according to the first embodiment of the present disclosure, in which the handle is coupled to the container.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'couple' or 'connect' as used herein, may refer not only to a case where one member and another member are directly combined or directly connected but also a case where one member is indirectly combined with another member via a connecting member or is indirectly connected.

Figure 2:
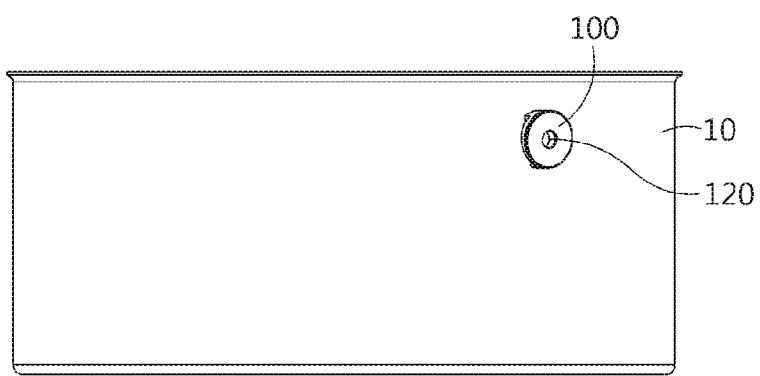
FIG. 2 is a perspective view showing the container having an attachable/detachable handle according to the first embodiment of the present disclosure and a fastening member, in which the handle is separated from the container.
Figure 3:
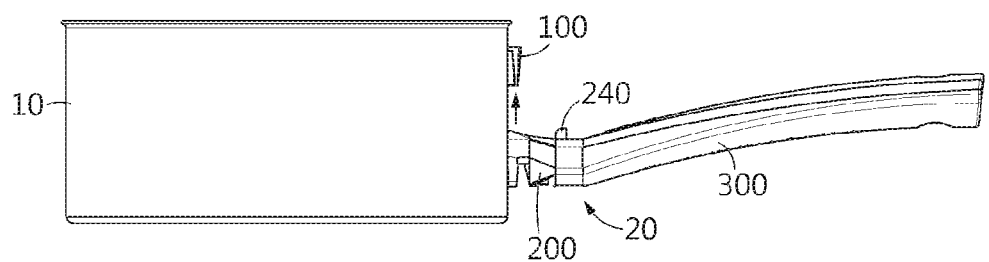
FIG. 3 is side view for illustrating that the handle is coupled to the container, in the container having an attachable/detachable handle according to the first embodiment of the present disclosure.
Figure 4:
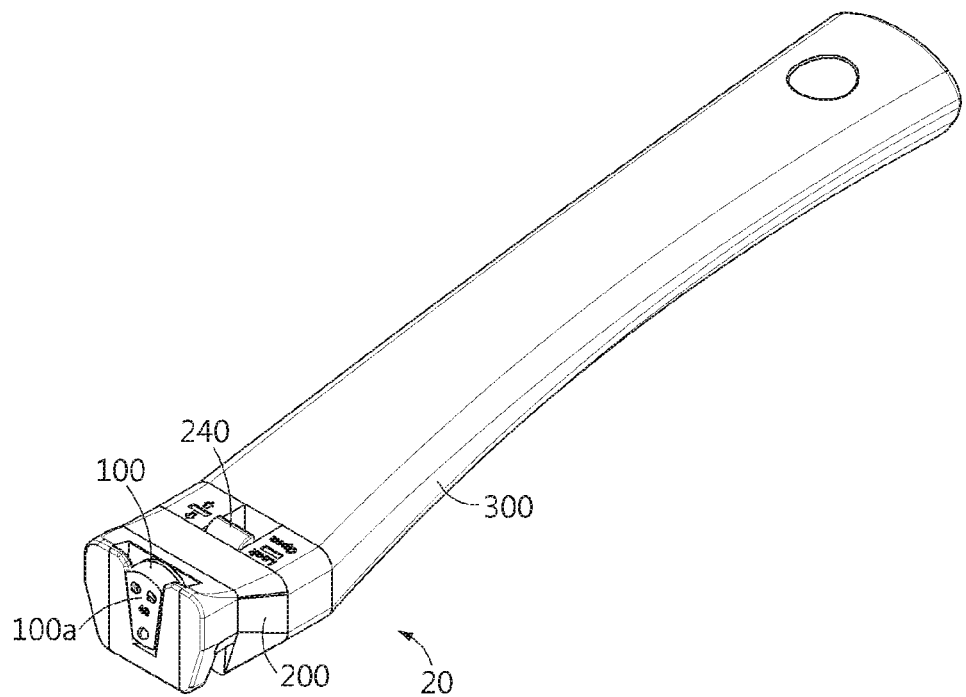
FIG. 4 is a perspective view showing that the fastening member is coupled to the handle, in the container having an attachable/detachable handle according to the first embodiment of the present disclosure.
Figure 5:
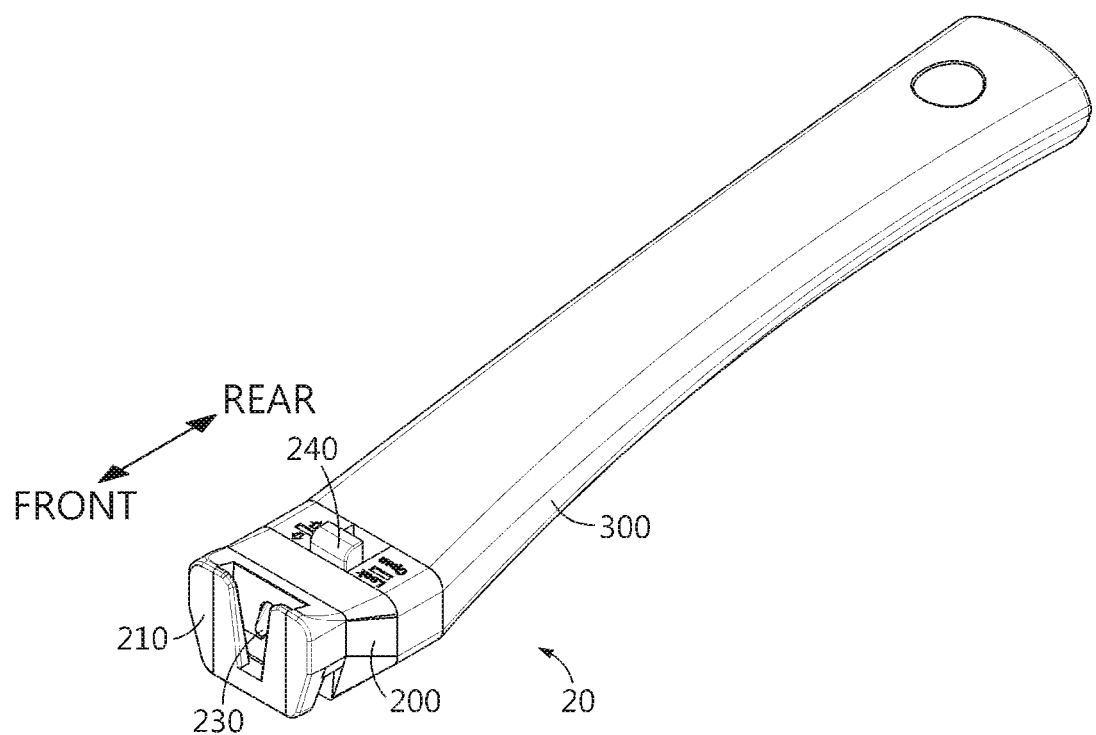
FIG. 5 is a perspective view showing that the fastening member is removed from the handle, in the container having an attachable/detachable handle according to the first embodiment of the present disclosure.
Figure 6:
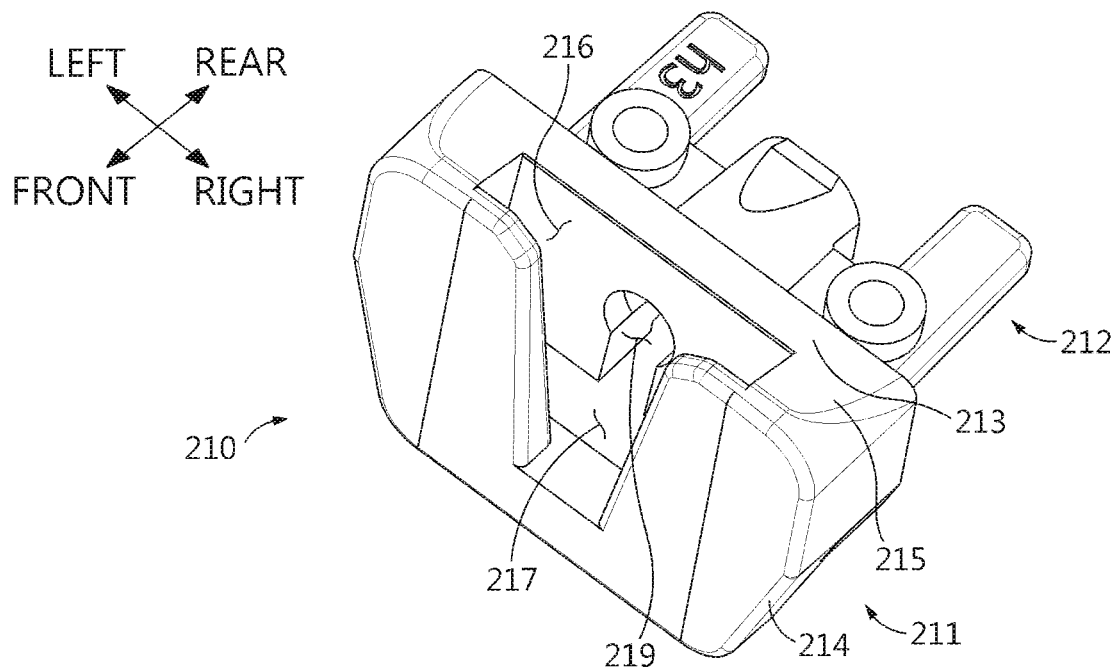
FIG. 6 is a perspective view showing a block body of the detachable block member, in the container having an attachable/detachable handle according to the first embodiment of the present disclosure.
Figure 7:
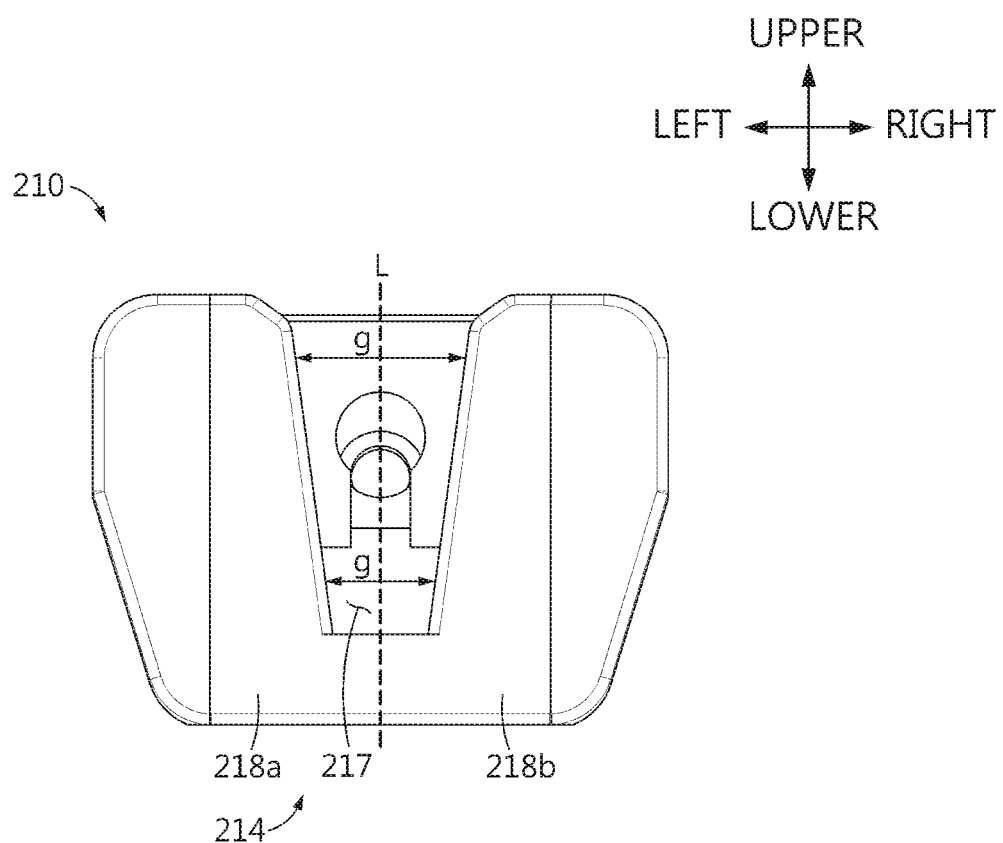
FIG. 7 is a front view showing the block body of FIG. 6.
Figure 8:
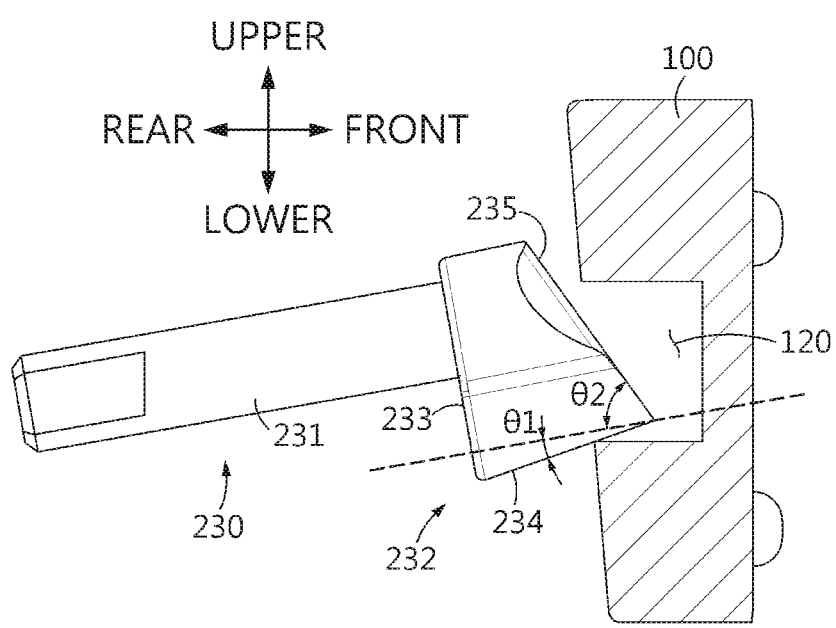
FIG. 8 is side view showing that the stopper member is coupled to a fastening groove of the fastening member, in the container having an attachable/detachable handle according to the first embodiment of the present disclosure.
Figure 9:
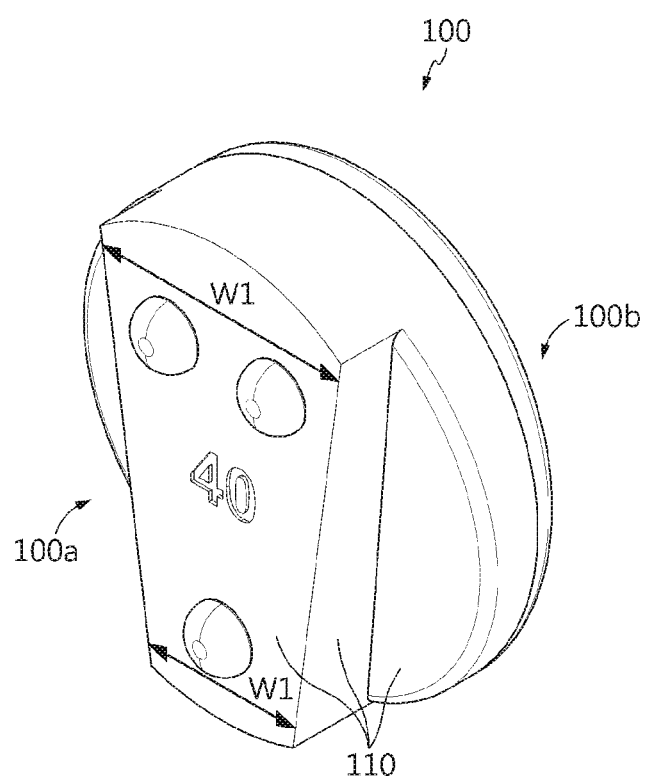
FIG. 9 is a perspective view showing one side of the fastening member, in the container having an attachable/detachable handle according to the first embodiment of the present disclosure.
Figure 10:
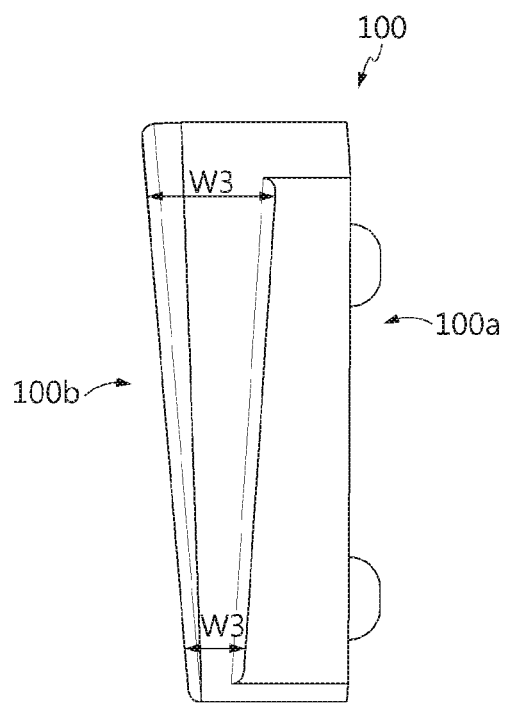
FIG. 10 is side view showing the fastening member, in the container having an attachable/detachable handle according to the first embodiment of the present disclosure.
Figure 11:
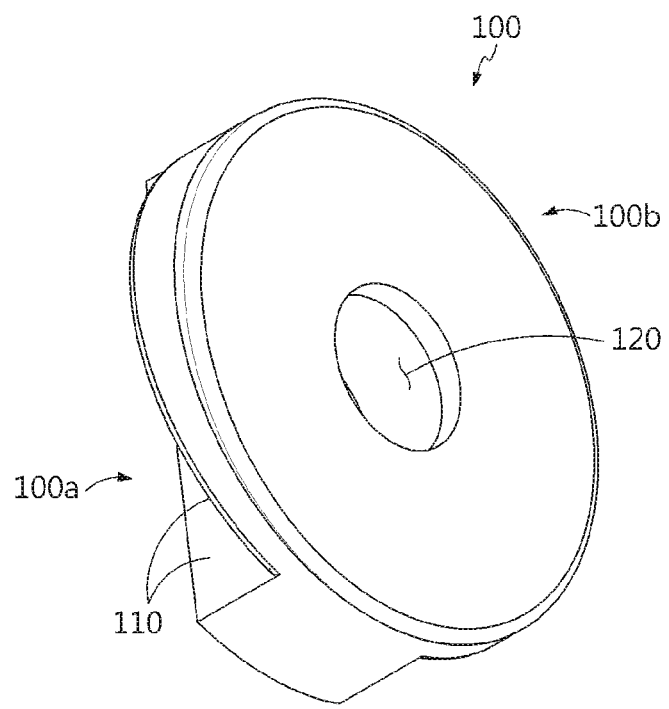
FIG. 11 is a perspective view showing the other side of the fastening member, in the container having an attachable/detachable handle according to the first embodiment of the present disclosure.
Figure 12:
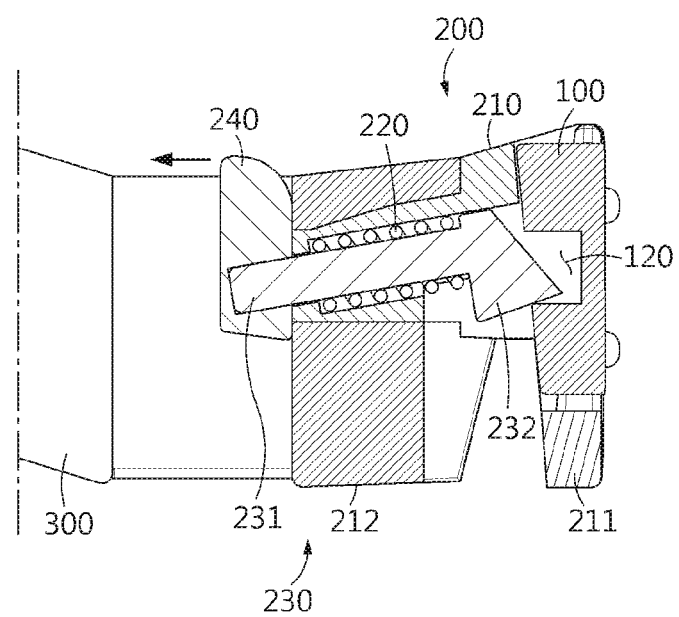
FIG. 12 is a sectional view showing that the fastening member is inserted into a detachable block member, in the container having an attachable/detachable handle according to the first embodiment of the present disclosure.
Figure 13:
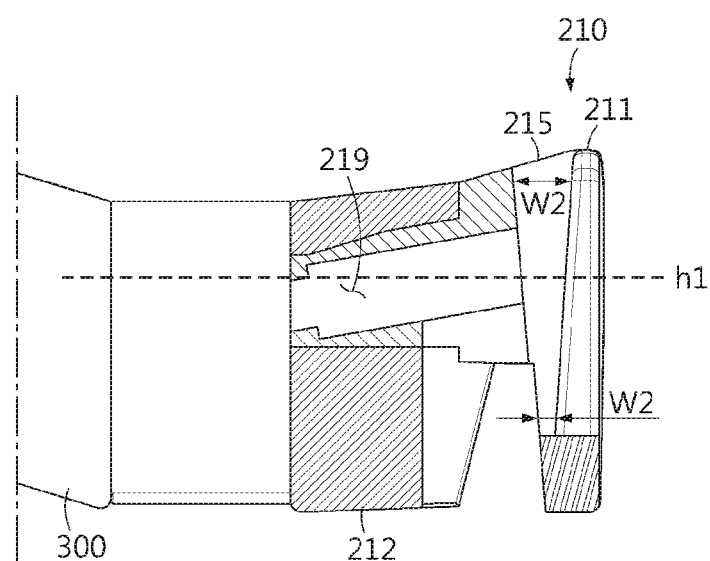
FIG. 13 is a sectional view showing that the stopper member and the fastening member are removed from FIG. 12.
Figure 14:
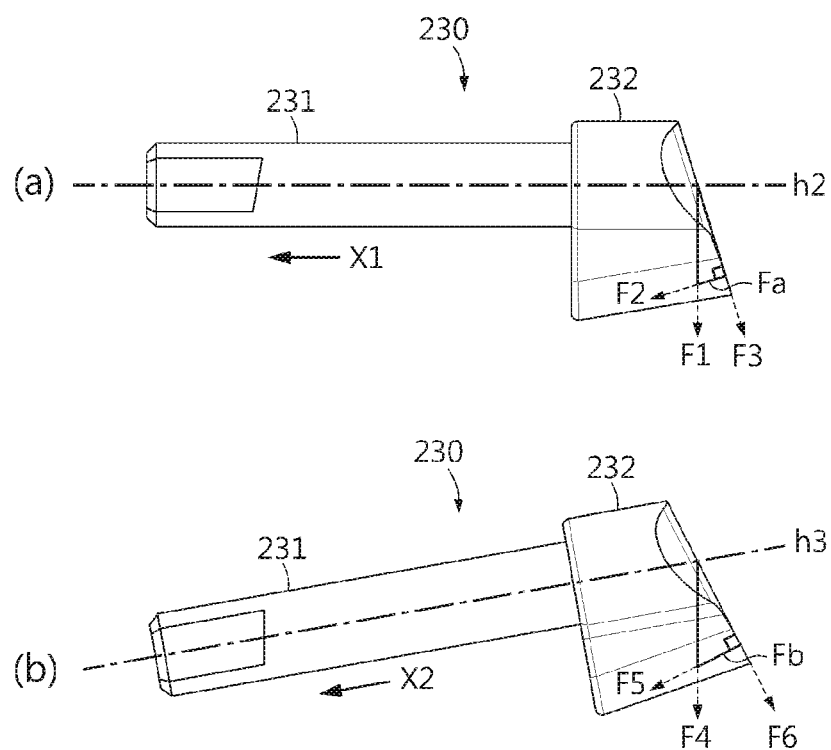
FIGS. 14(*a*) and 14(*b*) are exemplary diagrams showing a force applied to a moving shaft of the stopper member, in the container having an attachable/detachable handle according to the first embodiment of the present disclosure.

FIG. 1 is a perspective view showing an overall container having an attachable/detachable handle according to the first embodiment of the present disclosure, in which the handle is coupled to the container, FIG. 2 is a perspective view showing the container having an attachable/detachable handle according to the first embodiment of the present disclosure and a fastening member, in which the handle is separated from the container, FIG. 3 is side view for illustrating that the handle is coupled to the container, in the container having an attachable/detachable handle according to the first embodiment of the present disclosure, FIG. 4 is a perspective view showing that the fastening member is coupled to the handle, in the container having an attachable/detachable handle according to the first embodiment of the present disclosure, FIG. 5 is a perspective view showing that the fastening member is removed from the handle, in the container having an attachable/detachable handle according to the first embodiment of the present disclosure, FIG. 6 is a perspective view showing a block body of the detachable block member, in the container having an attachable/detachable handle according to the first embodiment of the present disclosure, FIG. 7 is a front view showing the block body of FIG. 6, FIG. 8 is side view showing that the stopper member is coupled to a fastening groove of the fastening member, in the container having an attachable/detachable handle according to the first embodiment of the present disclosure, FIG. 9 is a perspective view showing one side of the fastening member, in the container having an attachable/detachable handle according to the first embodiment of the present disclosure, FIG. 10 is side view showing the fastening member, in the container having an attachable/detachable handle according to the first embodiment of the present disclosure, FIG. 11 is a perspective view showing the other side of the fastening member, in the container having an attachable/detachable handle according to the first embodiment of the present disclosure, FIG. 12 is a sectional view showing that the fastening member is inserted into a detachable block member, in the container having an attachable/detachable handle according to the first embodiment of the present disclosure, FIG. 13 is a sectional view showing that the stopper member and the fastening member are removed from FIG. 12, and FIGS. 14(a) and 14(b) are exemplary diagrams showing a force applied to a moving shaft of the stopper member, in the container having an attachable/detachable handle according to the first embodiment of the present disclosure.

A container 10 including an attachable/detachable handle 20 according to an embodiment of the present disclosure includes a fastening member 100, a detachable block member 200, and a handle body 300. In this specification, the attachable/detachable handle 20 may be defined as referring to the handle body 300 to which the detachable block member 200 is coupled, namely as including both the detachable block member 200 and the handle body 300. In addition, the detachable block member 200 and the handle body 300 may be manufactured as an integral type or may be manufactured as a detachable type.

Figure 26:
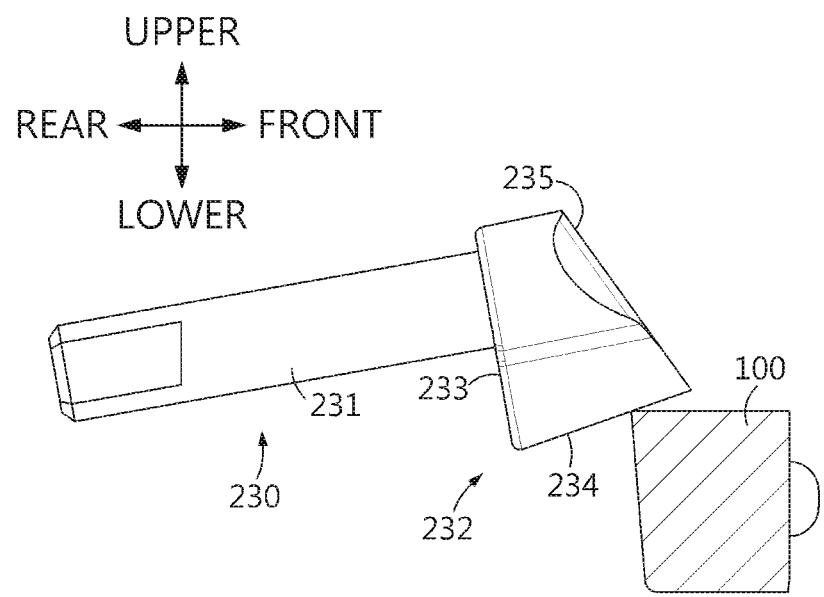
FIG. 26 is side view showing that the stopper member according to another embodiment of FIG. 8 contacts one side end of the fastening member.

Referring to FIGS. 1 and 2, the fastening member 100 is fixedly coupled to the container 10. The fastening member 100 may be coupled to the container 10 in various ways, and may be, for example, coupled to the container 10 by various welding methods. Alternatively, the fastening member 100 may be attached to the container 10 in a detachable manner so as to be capable of being attached to and detached from the container 10. Referring to FIG. 9, a step portion 110 may be formed at one side 100a of the fastening member 100 to which the container is coupled. However, the step portion 110 is not necessarily formed at one side of the fastening member 100. In addition, a fastening portion is formed at the other side 100b of the fastening member 100, which is opposite to one side 100a. The fastening portion may be provided in various ways. For example, referring to FIG. 11, the fastening portion may be a fastening groove 120. Alternatively, as shown in FIG. 26, the fastening portion may be one side end of the fastening member 100 to which a second portion 234 of a head 232 may come into contact. However, hereinafter, for convenience of explanation, it will be described that the fastening portion is the fastening groove 120 of FIG. 11. The step portion 110 may be coupled to a coupling groove 217 of a second support portion 214 of a block body 210 included in the detachable block member 200, explained later. Here, the coupling groove 217 of the second support portion 214 may be formed in a shape in which a separated gap thereof gradually decreases from an upper side to a lower side, for example in an approximately 'V' shape (see FIG. 6), and the step portion 110 of the fastening member 100 may have a shape corresponding to the coupling groove 217 of the second support portion 214 as shown in FIG. 9 so as to be coupled to the coupling groove 217 of the second support portion 214 (see FIG. 4). The coupling groove 217 of the second support portion 214 will be described later. A stopper member 230 of the detachable block member 200 may be detachably fastened to the fastening groove 120 formed at the other side 100b of the fastening member 100, as explained later. In the fastening member 100, one side 100a (see FIG. 9) of the fastening member 100 is fixedly coupled to the container 10 so that the step portion 110 faces the container 10 as shown in FIG. 2, and the fastening groove 120 is exposed out of the container 10 at an opposite side of the step portion 110. In addition, referring to FIG. 3, the attachable/detachable handle 20 is detachably coupled to the fastening member 100. Referring to FIG. 4, the attachable/detachable handle 20 is coupled to the fastening member 100. However, in FIG. 4, the fastening member 100 is separated from the container 10 to explain the configuration where the attachable/detachable handle 20 and the fastening member 100 are coupled. In fact, the fastening member 100 is fixedly coupled to the container 10 as shown in FIG. 2, and referring to FIG. 1, the attachable/detachable handle 20 is coupled to the fastening member 100 that is fixedly coupled to the container 10.

The detachable block member 200 may include a stopper member 230 that may be detachably fastened to the fastening groove 120 of the fastening member 100. Here, the detachable block member 200 includes the stopper member 230, and may further include a block body 210, an elastic member 220, and a lever 240. This will be described in detail below.

As shown in FIG. 6, the block body 210 has a space 216 in which the fastening member 100 may be inserted, and a perforated hole 219 in which the elastic member 220 and the stopper member 230 may be inserted. That is, the fastening member 100 fixedly coupled to the container 10 is inserted into the space 216 of the block body 210, and if the stopper member 230 inserted into the perforated hole 219 as shown in FIG. 5 contacts the fastening member 100 to receive a force, the fastening member 100 moves rearward based on FIG. 5. Here, if the fastening groove 120 of the fastening member 100 moves to the head 232 of the stopper member 230, the stopper member 230 moves toward the fastening groove 120 of the fastening member 100 by the elastic force of the elastic member 220, so that the head 232 of the stopper member 230 may be fastened to the fastening groove 120 of the fastening member 100.

Referring to FIG. 6, the block body 210 may include a front block 211 and a rear block 212. The front block 211 may have a space 216 in which the fastening member 100 is inserted, so that the fastening member 100 may be inserted into the space 216 of the front block 211. The front block 211 may include a first support portion 213, a second support portion 214, and a connection portion 215. The rear block 212 is coupled to the first support portion 213, and the perforated hole 219 may be formed from the first support portion 213 to the rear block 212. The second support portion 214 may be formed to be spaced apart from the first support portion 213. In addition, the space 216 in which the fastening member 100 may be inserted may be formed between the second support portion 214 and the first support portion 213 since the second support portion 214 is spaced apart from the first support portion 213. In addition, the coupling groove 217 to which the step portion 110 formed at the fastening member 100 may be coupled may be formed in the second support portion 214. That is, as shown in FIG. 3, if a user holds the handle body 300 of the attachable/detachable handle 20 and moves the attachable/detachable handle 20 from a lower side of the container 10 to which the fastening member 100 is attached to an upper side thereof, the fastening member 100 is inserted into the block body 210 of the detachable block member 200 of the attachable/detachable handle 20, for example into the space 216 between the first support portion 213 and the second support portion 214 of the block body 210, and the step portion 110 of the fastening member 100 is coupled to the coupling groove 217 of the second support portion 214. Here, referring to FIGS. 6 and 7, the second support portion 214 may include a pair of walls 218a, 218b, and the coupling groove 217 may be formed between the pair of walls 218a, 218b. That is, the pair of walls 218a, 218b may be formed to be partially spaced from each other based on a virtual vertical line L that is in a vertical direction passing through the center of the pair of walls 218a, 218b, and accordingly the coupling groove 217 may be formed between the pair of walls 218a, 218b. At this time, the pair of walls 218a, 218b may be configured to be symmetric with respect to the virtual vertical line L passing through the center of the pair of walls 218a, 218b. For example, as shown in FIG. 7, the pair of walls 218a, 218b may be configured to have open upper sides and connected lower sides so that the coupling groove 217 is formed between the pair of walls 218a, 218b. In addition, referring to FIG. 7, the coupling groove 217 may be formed so that a separated gap g thereof gradually decreases from an upper side to a lower side, for example in a substantially 'V' shape. If the coupling groove 217 is formed so that the separated gap g thereof gradually decreases from an upper side to a lower side as above, after the coupling groove 217 is coupled to the step portion 110 of the fastening member 100 formed in a shape corresponding to the coupling groove 217 as shown in FIG. 9 (see FIG. 4), it is possible to prevent the block body 210 and the fastening member 100 from moving in left and right directions based on FIG. 7. That is, assuming that the coupling groove 217 is formed horizontally without changing the gap g and the step portion 110 of the fastening member 100 is formed horizontally without changing the width w1 (see FIG. 9), a predetermined clearance must be artificially formed to prevent processing errors as well as collisions or interference between the step portion 110 and the coupling groove 217, and even if the fastening member 100 is coupled to the detachable block member 200, the attachable/detachable handle 20 may move to the left and right from the container 10 due to the clearance between the step portion 110 and the coupling groove 217 as above. However, in the container 10 including the attachable/detachable handle 20 according to the first embodiment of the present disclosure, the coupling groove 217 is formed so that the separated gap g thereof gradually decreases from an upper side to a lower side, and the center portion of the fastening member 100 in which the step portion 110 is formed is formed so that the width w1 (see FIG. 9) gradually decreases from an upper side to a lower side, thereby removing or reducing processing errors or clearances. Thus, it is possible to prevent the attachable/detachable handle 20 from moving to the left and right based on FIG. 7. That is, as shown in FIG. 4, the fastening member 100 may be accurately inserted into the detachable block member 200 without a clearance. Referring to FIG. 6 again, the connection portion 215 is configured to connect the first support portion 213 and the second support portion 214. Referring to FIG. 13, the connection portion 215 may be formed to have a width w2 gradually decreasing from an upper side to a lower side based on an inner cross section. In addition, referring to FIG. 10, a side surface of the fastening member 100 contacting the inner side of the connection portion 215 may be formed such that a width w3 thereof gradually decreases from an upper side to a lower side. That is, like the coupling groove 217 and the step portion 110 described above, the width w2 of the inner side of the connection portion 215 and the width w3 of the side surface of the fastening member 100 are formed to gradually decrease from an upper side to a lower side, so it is possible to prevent the attachable/detachable handle 20 and the fastening member 100 from moving front and rear directions based on FIG. 6. Accordingly, the attachable/detachable handle 20 may be prevented from moving in front and rear direction based on FIG. 6. In addition, if the width w2 of the inner side of the connection portion 215 is changed, namely if the inner side of the connection portion 215 is inclined and the side surface of the fastening member 100 is also inclined, when the block body 210 is inserted into the fastening member 100, the inclination formed at the inner side of the connection portion 215 moves along the inclination formed at the side surface of the fastening member 100, so the block body 210 may be easily inserted into the fastening member 100. That is, the inclination of the inner side of the connection portion 215 and the side surface of the fastening member 100 may serve as a guide. The rear block 212 is coupled to the front block 211 and has a perforated hole 219 (see FIG. 13) so that the elastic member 220 and the stopper member 230 may be inserted into the perforated hole 219 (see FIG. 12). The rear block 212 may be integrally formed with the front block 211, or the rear block 212 may be coupled to the front block 211 after the rear block 212 and the front block 211 are separately manufactured.

As shown in FIG. 12, the elastic member 220 may be inserted into the perforated hole 219 of the block body 210. The elastic member 220 may employ various members having an elastic recovery force, and the elastic member 220 may include, for example, a coil spring that may be inserted into the perforated hole 219. For example, if a user pulls the lever 240, explained later, to move the stopper member 230 coupled to the lever 240 in a predetermined direction and then releases the lever 240, the stopper member 230 may move in a direction opposite to the predetermined direction by the elastic recovery force of the elastic member 220. Meanwhile, as another embodiment, the elastic member 220 may be coupled to the block body 210 and the lever 240, respectively, without being inserted into the perforated hole 219. That is, one side end of the elastic member 220 may be coupled to the block body 210, and the other side end of the elastic member 220 may be coupled to the lever 240. In addition, the stopper member 230 may be inserted into the perforated hole 219 and coupled to the lever 240 to receive an elastic force from the elastic member 220 coupled to the lever 240, and accordingly the stopper member 230 may be fastened to the fastening groove 120 formed at the fastening member 100.

Referring to FIG. 12, the stopper member 230 may be inserted into the perforated hole 219 and coupled to the elastic member 220 as described above so as to be fastened to the fastening groove 120 of the fastening member 100 while moving by receiving the elastic force. However, the movement method of the stopper member 230 is not limited to the elastic member 220 and may adopt various methods. That is, as long as the stopper member 230 may move and be fastened to the fastening groove 120, the stopper member 230 may be provided to move through various methods. In addition, the stopper member 230 may be fastened to the fastening groove 120 formed at the fastening member 100.

Referring to FIGS. 8 and 12, the stopper member 230 may include a moving shaft 231 and a head 232. The moving shaft 231 may be formed in a longitudinal direction to be movable. The moving shaft 231 may be inserted into the perforated hole 219 and coupled to the lever 240. That is, if a user pulls the lever 240, the moving shaft 231 coupled to the lever 240 moves in a preset direction inside the perforated hole 219 of the block body 210. In addition, the head 232 is coupled to the moving shaft 231 and moves together with the moving shaft 231. In addition, if the user releases the lever 240, the head 232 and the moving shaft 231 move by the elastic recovery force of the elastic member 220, and the head 232 moves toward the fastening groove 120 of the fastening member 100 and comes into contact with the fastening groove 120 as shown in FIG. 8. Accordingly, the attachable/detachable handle 20 may be fastened to the fastening member 100 of the container 10. Alternatively, when the fastening member 100 is inserted into the block body 210 in a state where the user does not pull the lever 240, if the fastening member 100 contacts the head 232 and pushes the head 232 rearward based on FIG. 5, the elastic member 220 elastically contracts so that the head 232 and the moving shaft 231 move rearward. Also, if the head 232 moves to the fastening groove 120 of the fastening member 100, the head 232 and the moving shaft 231 moves forward by the elastic recovery force of the elastic member 220, so that the head 232 contacts the fastening groove 120 of fastening member 100 as shown in FIG. 8. That is, in order to couple the head 232 to the fastening member 100, the user may insert the fastening member 100 into the block body 210 while pulling the lever 240, or may insert the fastening member 100 into the block body 210 without pulling the lever 240. Referring to FIG. 13, the perforated hole 219 of the block body 210 may be configured to have an inclination based on a virtual horizontal line h1 orthogonal to the peripheral surface of the container 10, and the moving shaft 231 may be inserted along the perforated hole 219 with the inclination. Referring to FIGS. 13 and 14(a), the perforated hole 219 is not inclined based on a virtual horizontal line h2 orthogonal to the peripheral surface of the container 10, where in the force F1 provided from the top, a component force of the force to move the moving shaft 231 to the rear of the perforated hole 219, namely in a direction of an arrow X1, is F2. Referring to FIGS. 13 and 14(b), the perforated hole 219 is inclined based on the virtual horizontal line h1 orthogonal to the peripheral surface of the container 10, where in the force F4 provided from the top, a component force of the force to move the moving shaft 231 to the rear of the perforated hole 219, namely in a direction of an arrow X2, is F5. Comparing the embodiments of FIGS. 14(a) and 14(b), in the embodiment of FIG. 14(b), the moving shaft 231 may be easily moved to the rear of the perforated hole 219 along the arrow X2 with a smaller force compared to the embodiment of FIG. 14(a). That is, if F1 of FIGS. 14(a) and F4 of FIG. 14(b) have the same magnitude, seeing the force for moving the moving shaft 231 to the rear, Fb, which is the magnitude of F5 of FIG. 14(b), is larger than Fa, which is the size of F2 of FIG. 14(a). Thus, in the embodiment of FIG. 14(b) in which the perforated hole 219 is inclined, the moving shaft 231 may be easily moved rearward along the arrow X2 with a smaller force compared to the embodiment of FIG. 14(a).

Figure 28:
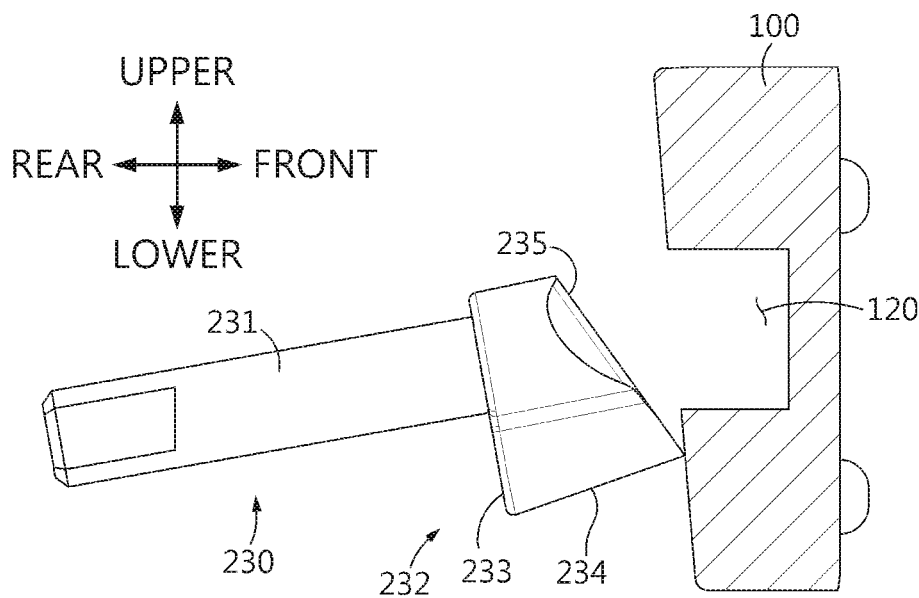
FIGS. 28 to 30 are diagrams for illustrating a process in which the stopper member is coupled to the fastening groove of the fastening member, in the container having an attachable/detachable handle according to the sixth embodiment of the present disclosure.
Figure 29:
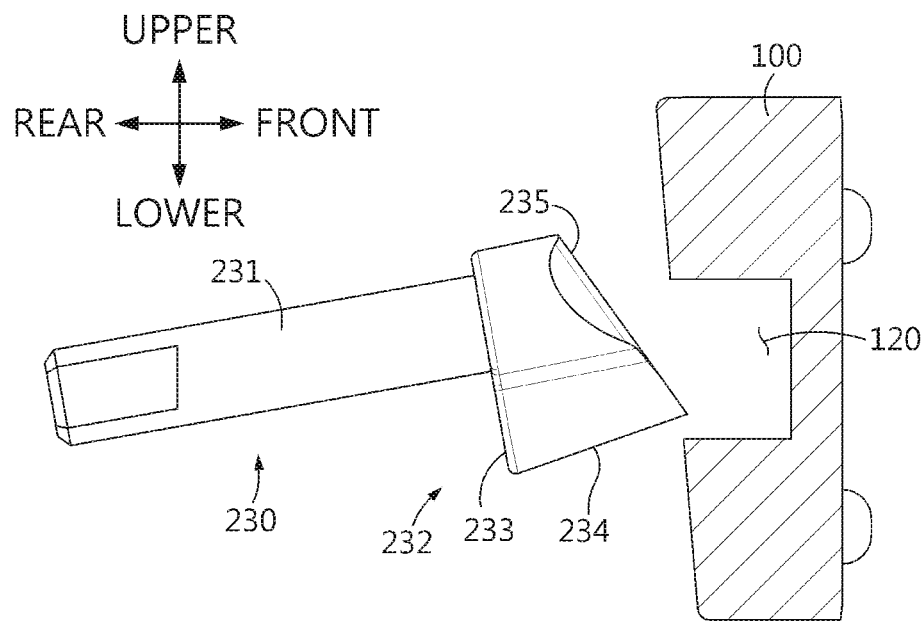
Figure 30:
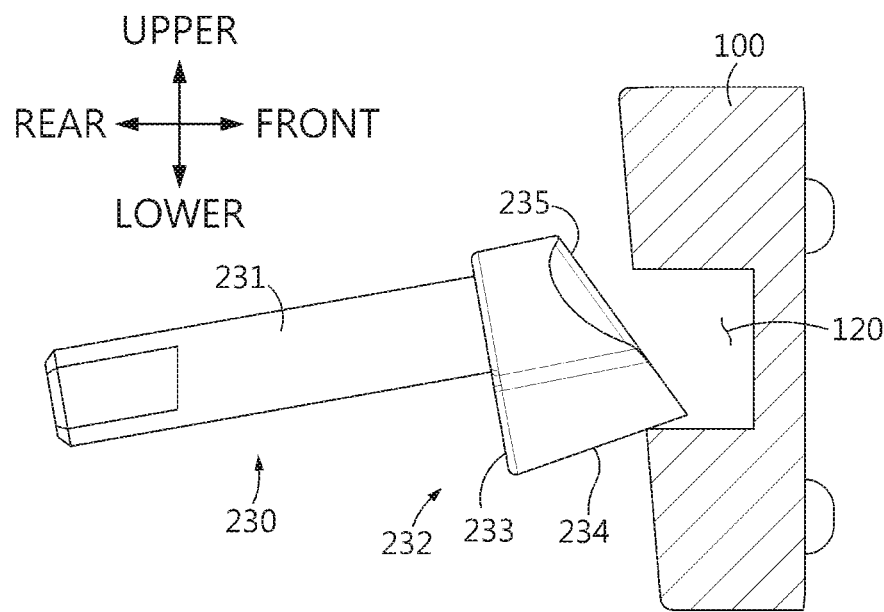

The head 232 may move together with the moving shaft 231 to contact the fastening groove 120. The head 232 may include a first portion 233, a second portion 234, and a third portion 235. The first portion 233 is a portion coupled to the moving shaft 231 and is disposed at the rear based on FIG. 8, and the first portion 233 may be coupled to the moving shaft 231 so that the first portion 233 and the moving shaft 231 intersect each other, for example orthogonal to each other, as shown in FIG. 8. Here, the first portion 233 may be coupled to have various angles with respect to the moving shaft 231. The second portion 234 is a portion coupled to the first portion 233 and is disposed at a side based on FIG. 8, and the second portion 234 may contact one side of the fastening groove 120, for example a lower side of the fastening groove 120 based on FIG. 8. Here, the second portion 234 may be directly coupled to the first portion 233, or may be indirectly coupled via another member. The second portion 234 may have an inclination based on the moving shaft 231. That is, the second portion 234 and the moving shaft 231 may be configured to have a first angle θ1. Here, the second portion 234 may be inclined upward or downward with respect to the moving shaft 231, and for example, the second portion 234 may be inclined downward rather than the moving shaft 231 with respect to the moving shaft 231. Referring to FIGS. 28 to 30, in FIG. 28, the stopper member 230 moves upward along the fastening member 100 in contact with the fastening member 100, and referring to FIG. 29, the head 232 of the stopper member 230 is instantaneously separated from the fastening member 100 while moving toward the fastening groove 120. In addition, referring to FIG. 30, as the head 232 moves toward the fastening member 100 by the elastic force of the elastic member 620, the second portion 234 of the head 232 comes into contact with the fastening groove 120. This principle is possible because the second portion 234 is inclined to have the first angle θ1 (see FIG. 8) with respect to the moving shaft 231. That is, referring to FIG. 13, the perforated hole 219 of the block body 210 may have an inclination based on the virtual horizontal line h1 as described above, and referring to FIG. 12, the moving shaft 231 may be inserted along the perforated hole 219 with an inclination. Thus, if the elastic force of the elastic member 220 is applied, the moving shaft 231 moves toward the fastening groove 120 along the inclination of the perforated hole 219 as shown in FIGS. 12 and 13. Here, if the second portion 234 and the moving shaft 231 of FIG. 8 are parallel, namely if the first angle θ) of FIG. 8 is zero, even though the moving shaft 231 moves toward the fastening groove 120 by the elastic force of the elastic member 220, the second portion 234 parallel to the moving shaft 231 does not contact the lower side of the fastening groove 120, and the head 232 may be inserted into the fastening groove 120 to generate a clearance between the head 232 and the fastening groove 120. However, since the second portion 234 and the moving shaft 231 are inclined as much as the first angle θ1, if the moving shaft 231 continuously moves toward the fastening groove 120, the moving shaft 231 comes into contact with the fastening groove 120 at an arbitrary position in the second portion 234 (see FIG. 30). In addition, as shown in FIG. 30, the head 232 continues to move along the inclined surface of the second portion 234 in a state where the second portion 234 of the head 232 is in contact with the lower side of the fastening groove 120, so that the head 232 stops by contacting at least one of the detachable block member 200 and the fastening groove 120. That is, although not shown in FIG. 30, referring to FIG. 12, since the second portion 234 of the head 232 contacts the lower side of the fastening groove 120 and the upper portion of the head 232 contacts the block body 210 of the detachable block member 200, namely since the head 232 is caught in contact with the block body 210 and the fastening groove 120 of the detachable block member 200 at an upper side and a lower side thereof, respectively, a clearance does not occur at all, and accordingly, the attachable/detachable handle 20 may be fixed without movement. In FIG. 12, the head 232 is separated from the fastening member 100. That is, although the third portion 235 (see FIG. 8) of the head 232 is separated from the fastening groove 120 of the fastening member 100, the head 232 may be in contact with the fastening member 100. That is, as shown in FIGS. 29 and 30, while the second portion 234 of the head 232 continues to move upward along the inclined surface of the second portion 234 in contact with the lower side of the fastening groove 120 of the fastening member 100, if the upper side of the head 232 comes into contact with the block body 210 of the detachable block member 200 (see FIG. 12), or if the third portion 235 (see FIG. 8) of the head 232 comes into contact with the upper side of the fastening groove 120 of the fastening member 100 although not shown in the drawing, or if the head 232 comes into contact with both the block body 210 of the detachable block member 200 and the upper side of the fastening groove 120 of the fastening member 100, the head 232 stops moving. That is, since the head 232 is in contact with the lower side of the fastening groove 120 and the block body 210 and is tightly clamped between the lower side of the fastening groove 120 and the block body 210, there is no clearance, thereby preventing the head 232 from moving. Meanwhile, it is also possible that only the second portion 234 of the head 232 is in contact with the lower side of the fastening groove 120 and the head 232 is spaced apart from the block body 210 of the detachable block member 200 and the upper side of the fastening groove 120 of the fastening member 100. In this case, the head may stop moving due to a frictional force caused by the contact between the second portion 234 of the head 232 and the lower side of the fastening groove 120, and thus a slight movement may occur upward. However, since the movement of the moving shaft 231 and the head 232 may be prevented by the lever 240 coupled to the moving shaft 231, the purpose of the present disclosure may be achieved. In addition, the third portion 235 is a portion coupled to the second portion 234, and the third portion 235 may also be directly coupled to the second portion 233 or indirectly coupled thereto via another member. The third portion 235 is disposed at the front based on FIG. 8 and may be spaced apart from the other side of the fastening groove 120, for example an upper side of the fastening groove 120 based on FIG. 8, or may also be in contact with the upper side of the fastening groove 120 based on FIG. 8. That is, the third portion 235 is not necessarily in contact with the fastening groove 120, and may be separated from the fastening groove 120. Like the second portion 234, the third portion 235 may have an inclination with respect to the moving shaft 231. That is, the third portion 235 and the moving shaft 231 may be configured to have a second angle θ2. If the third portion 235 is formed to have an inclination, the fastening member 100 may easily move along the inclined surface of the third portion 235, so that the stopper member 230 may be moved with a smaller force. In addition, the third portion 235 may be inclined upward or downward based on the moving shaft 231, and for example, the third portion 235 may be formed to be inclined upward rather than the moving shaft 231 based on the moving shaft 231. Here, the inclination of the second portion 234 and the inclination of the third portion 235 based on the moving shaft 231 may be formed such that the first angle θ1 formed between the second portion 234 and the moving shaft 231 is smaller than the second angle θ2 formed between the third portion 235 and the moving shaft 231 based on an acute angle. If the inclinations are formed in the second portion 234 and the third portion 235 as above with respect to the moving shaft 231, after the head 232 of the stopper member 230 contacts the fastening groove 120, the head 232 may be prevented from moving in upper and lower directions based on FIG. 8. That is, like the coupling groove 217 and the step portion 110 described above, if an inclination is not formed in the head 232, a predetermined clearance must be artificially formed to prevent processing errors as well as collisions or interference between the head 232 and the fastening groove 120. In this case, even if the head 232 is fastened in contact with the fastening groove 120, the attachable/detachable handle 20 may move up and down from the container 10. However, in the container 10 including the attachable/detachable handle 20 according to the first embodiment of the present disclosure, since the second portion 234 and the third portion 235 of the head 232 are inclined with respect to the moving shaft 231, it is possible to remove or reduce processing errors or clearances, thereby preventing the attachable/detachable handle 20 from moving upper and lower directions based on FIG. 8. That is, the head 232 may be accurately contacted and fastened to the fastening groove 120 without a clearance. However, both the second portion 234 and the third portion 235 of the head 232 are not necessarily inclined, and at least one of the second portion 234 and the third portion 235 may be inclined as necessary. Meanwhile, if a user turns the attachable/detachable handle 20 over, namely if the upper and lower parts of the fastening member 100 are reversed based on FIG. 8, the upper and lower parts of the stopper member 230 are also reversed. Here, if a force is applied in the direction of gravity, the moving shaft 231 of the stopper member 230 receives the force toward the fastening member 100, so the attachable/detachable handle 20 is more securely fixed to the fastening member 100.

Referring to FIGS. 5 and 12, the lever 240 is coupled to the stopper member 230, and a user may release the stopper member 230 from the fastening groove 120 by holding and operating the lever 240. For example, when the user pulls the lever 240 in the direction of the arrow in FIG. 12, the stopper member 230 coupled to lever 240 moves in the moving direction of the lever 240, and thus the head 232 of the stopper member 230 may be separated from the fastening groove 120 of the fastening member 100.

Referring to FIG. 5, the detachable block member 200 is coupled to the handle body 300, and the handle body 300 may be formed in a shape that is easily gripped by a user. The handle body 300 may be made of various materials, for example metal or plastic. However, the material of the handle body 300 is not limited thereto, and more diverse materials may be used.

Hereinafter, the operation and effect of the container 10 including the attachable/detachable handle 20 according to the first embodiment of the present disclosure will be described with reference to the drawings.

Referring to FIG. 2, the fastening member 100 is coupled to the container 10. Here, referring to FIG. 3, if the attachable/detachable handle 20 is raised from the lower side to the upper side of the fastening member 100 based on FIG. 3, the fastening member 100 is inserted into the space 216 formed in the block body 210 of the detachable block member 200. At this time, if the fastening member 100 is inserted into the space 216 of the block body 210, the head 232 of the stopper member 230 inserted into the perforated hole 219 of the block body 210 comes into contact with the fastening member 100 as shown in FIG. 5, and the fastening member 100 is inserted into the space 216 to give a force to the head 232 of the stopper member 230 while moving relatively downward with respect to the detachable block member 200. By the provided force, the head 232 receives a force rearward based on FIG. 5. That is, based on the relative movement of the fastening member 100 with respect to the block body 210, the fastening member 100 is inserted into the space 216 of the block body 210 from the upper side to the lower side of the block body 210 to contact the head 232, thereby pushing the head 232 rearward. Since the head 232 is connected to the moving shaft 231 and the elastic member 220 is connected to the stopper member 230 as shown in FIG. 12, if the head 232 receives a force by the fastening member 100, the elastic member 220 elastically contracts to move rearward based on FIG. 5 in a state where the head 232 and the moving shaft 231 are inserted into the perforated hole 219. In addition, if the fastening member 100 continues to move downward and the head 232 is placed at the position of the fastening groove 120, the head 232 moves forward based on FIG. 5 by the elastic recovery force of the elastic member 220 connected to the head 232 so as to contact and be fastened to the fastening groove 120 of the fastening member 100 as shown in FIGS. 8 and 12. Accordingly, the attachable/detachable handle 20 is fastened to the fastening member 100 of the container 10. Here, referring to FIGS. 12 and 13, the perforated hole 219 is inclined, and the moving shaft 231 inserted into the perforated hole 219 is also disposed to be inclined, whereby the user may easily move the stopper member 230 rearward based on FIG. 5, namely along the arrow X2 direction of FIG. 14(b), just with a little force.

Meanwhile, if the attachable/detachable handle 20 is fastened to the fastening member 100 of the container 10, the coupling groove 217 formed at the second support portion 214 of the block body 210 may be formed such that its gap g (see FIG. 7) gradually decreases from an upper side toward a lower side, for example in an approximately 'V' shape. In addition, the central portion of the fastening member 100 where the step portion 110 is formed may be formed such that its width w1 (see FIG. 9) gradually decreases from the upper side to the lower side, thereby removing or reducing processing errors or clearances. Thus, it is possible to prevent the attachable/detachable handle 20 from moving in left and right directions based on FIG. 7. In addition, the connection portion 215 may be formed such that its width w2 (see FIG. 13) gradually decreases from the upper side to the lower side based on the cross section of the inner side, and referring to FIG. 10, the side surface of the fastening member 100 in contact with the inner side of the connection portion 215 may be formed such that its width w3 gradually decreases from the upper side to the lower side, thereby preventing the attachable/detachable handle 20 from moving in front and rear directions based on FIG. 6. In addition, referring to FIG. 8, the second portion 234 of the head 232 of the stopper member 230 may be inclined with respect to the moving shaft 231, and the third portion 235 of the head 232 of the stopper member 230 may also be inclined with respect to the moving shaft 231, like the second portion 234. Since the second portion 234 and the third portion 235 are inclined based on the moving shaft 231, it is possible to prevent the attachable/detachable handle 20 from moving in upper and lower directions based on FIG. 8.

As described above, the container 10 including the attachable/detachable handle 20 according to the first embodiment of the present disclosure may prevent the container 10 and the attachable/detachable handle 20 from moving in all directions, namely in front, rear, left, right, upper and lower directions, thereby securing stable and convenient cooking to the user.

In addition, the user may couple the attachable/detachable handle 20 to the container 10 just by griping the handle body 300 of the attachable/detachable handle 20 and then raising the attachable/detachable handle 20 upward from the lower side of the fastening member 100 coupled to the container 10. In addition, the user may detach the attachable/detachable handle 20 from the container 10 just by pulling the lever 240 to move the attachable/detachable handle 20 downwards. Therefore, it is possible to secure each and convenient attachment and detachment.

In addition, since a plurality of containers 10 from which the handle 20 is separated may be stored, the handles 20 and the containers 10 do not interfere or collide, thereby securing easy storage and reducing the volume of the stored containers 10.

Meanwhile, as a modified embodiment of the container having an attachable/detachable handle according to the first embodiment of the present disclosure, the case where the fastening member 100 is coupled to the handle body 300 and the block body 210 is coupled to the container 10 may be considered.

Figure 15:
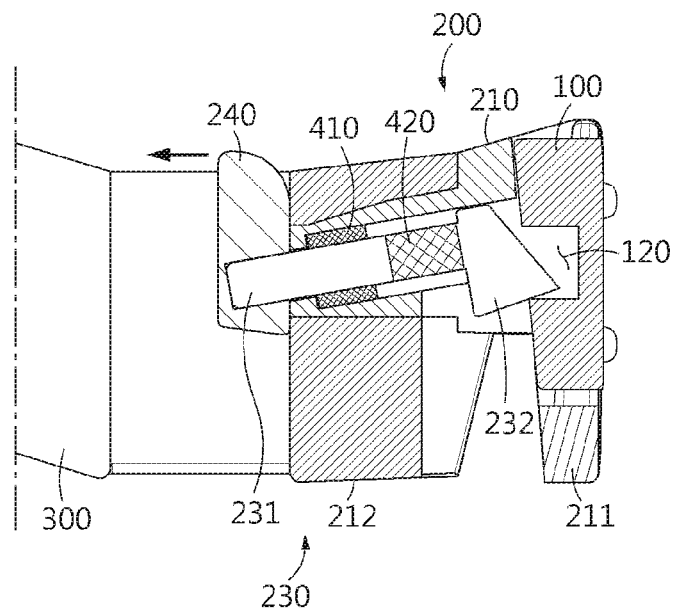
FIG. 15 is a sectional view showing that the fastening member is inserted into a detachable block member, in a container having an attachable/detachable handle according to the second embodiment of the present disclosure.

FIG. 15 is a sectional view showing that the fastening member is inserted into a detachable block member, in a container having an attachable/detachable handle according to the second embodiment of the present disclosure.

Hereinafter, the operation and effect of the container 10 including the attachable/detachable handle 20 according to the second embodiment of the present disclosure will be described with reference to the drawings. However, the features identical to those of the container 10 including the attachable/detachable handle 20 according to the first embodiment of the present disclosure will not be described in detail, and different features will be described in detail.

The second embodiment of the present disclosure is different from the first embodiment in that magnets 410, 420 are included in a portion of the block body 210 and a portion of the stopper member 230 in place of the elastic member 220 in the detachable block member 200.

The detachable block member 200 includes a block body 210, a stopper member 230, and a lever 240. As in the first embodiment, the block body 210 has a space 216 and a perforated hole 219 into which the fastening member 100 may be inserted, and they are already described in the first embodiment. Also, referring to FIG. 15, a portion of the block body 210 is formed as the magnet 410. As in the first embodiment, the stopper member 230 is inserted into the perforated hole 219 and fastened to the fastening groove 120 formed in the fastening member 100, and this is already described in the first embodiment. In addition, referring to FIG. 15, a portion of the stopper member 230, for example a portion of the moving shaft 231, is formed as the magnet 420 having the same polarity as the magnet 410 of the block body 210. Meanwhile, the lever 240 is coupled to the stopper member 230 like the first embodiment, and this is already described in the first embodiment.

FIG. 15 shows a state where the stopper member 230 moves toward the fastening member 100 so that the head 232 is fastened to the fastening groove 120, and thus the attachable/detachable handle 20 is coupled to the container 10. Here, if a user pulls the lever 240 in order to separate the attachable/detachable handle 20 from the container 10, the magnet 410 of the block body 210 and the magnet 420 of the moving shaft 231 of the stopper member 230 are placed close to each other. Also, if the user releases the lever 240 after the attachable/detachable handle 20 is separated from the container 10, the magnet 410 of the block body 210 and the magnet 420 of the moving shaft 231 of the stopper member 230 having the same polarity push each other. That is, even if the stopper member 230 does not have the elastic member 220 of the first embodiment, the stopper member 230 may be restored to its original position by the repulsive force of the magnets 410, 420 having the same polarity.

Figure 16:
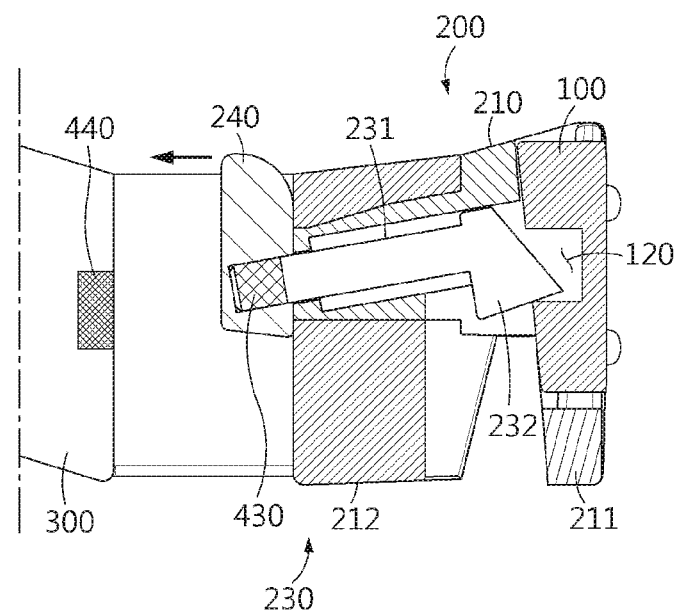
FIG. 16 is a sectional view showing that the fastening member is inserted into a detachable block member, in a container having an attachable/detachable handle according to the third embodiment of the present disclosure.

FIG. 16 is a sectional view showing that the fastening member is inserted into a detachable block member, in a container having an attachable/detachable handle according to the third embodiment of the present disclosure.

Hereinafter, the operation and effect of the container 10 including the attachable/detachable handle 20 according to the third embodiment of the present disclosure will be described with reference to the drawings. However, the features identical to those of the container 10 including the attachable/detachable handle 20 according to the first embodiment or the second embodiment of the present disclosure will not be described in detail, and different features will be described in detail.

The third embodiment of the present disclosure is different from the first embodiment and the second embodiment in that magnets 430, 440 are included in at least a portion of the lever 240 and a portion of the handle body 300 instead of the elastic member 220 in the detachable block member 200.

The detachable block member 200 includes a block body 210, a stopper member 230, and a lever 240. The block body 210 and the stopper member 230 are identical to those of the first embodiment and thus will not be described again. The lever 240 is coupled to the stopper member 230 as in the first embodiment, and referring to FIG. 16, at least a portion of the lever 240 is formed as the magnet 430. In addition, a portion of the handle body 300, for example a portion of the inner side of the handle body 300, is formed as the magnet 440 having the same polarity as the magnet 430 of the lever 240. In addition, like the second embodiment, if the user pulls the lever 240 in order to separate the attachable/detachable handle 20 from the container 10, the magnet 430 of the lever 240 and the magnet 440 of the handle body 300 are placed at close positions. Here, if the user releases the lever 240 after the attachable/detachable handle 20 is separated from the container 10, the magnet 430 of the lever 240 and the magnet 440 of the handle body 300 having the same polarity push each other. That is, even if the stopper member 230 does not have the elastic member 220 of the first embodiment, the stopper member 230 may be restored to its original position by the repulsive force of the magnets 430, 440 having the same polarity.

Figure 17:
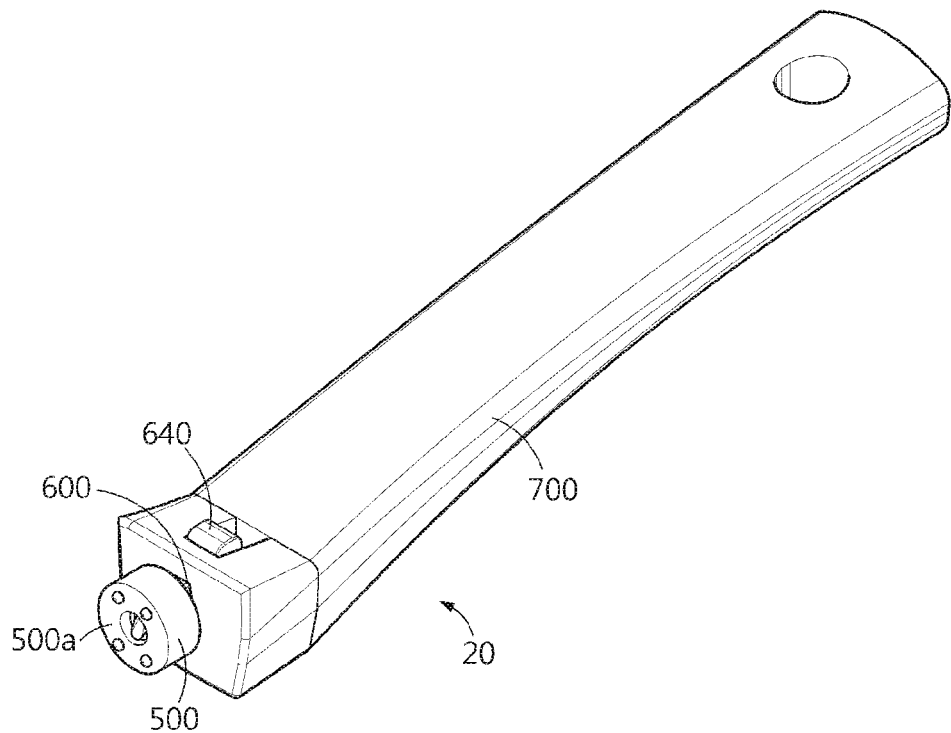
FIG. 17 is a perspective view showing an overall container having an attachable/detachable handle according to the fourth embodiment of the present disclosure, in which the fastening member is coupled to the handle.
Figure 18:
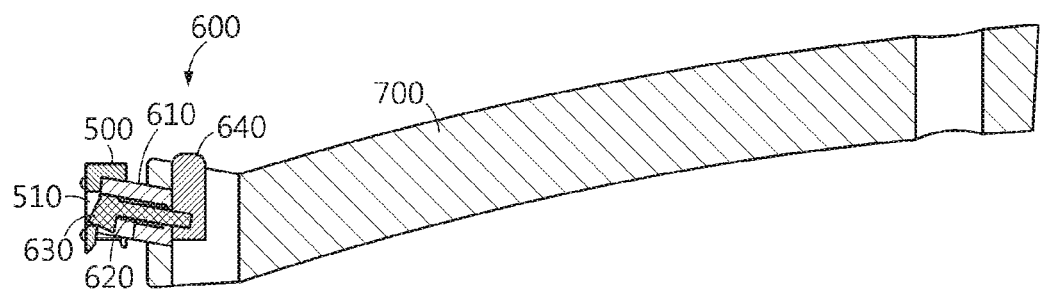
FIG. 18 is a side sectional view of FIG. 17.
Figure 19:
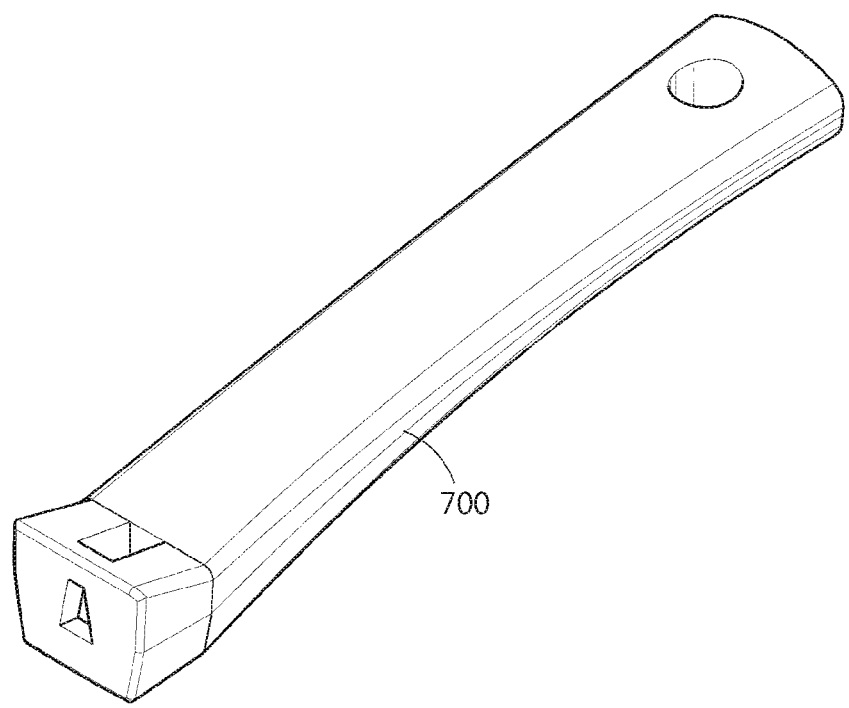
FIG. 19 is a perspective view showing a handle body, in the container having an attachable/detachable handle according to the fourth embodiment of the present disclosure.
Figure 20:
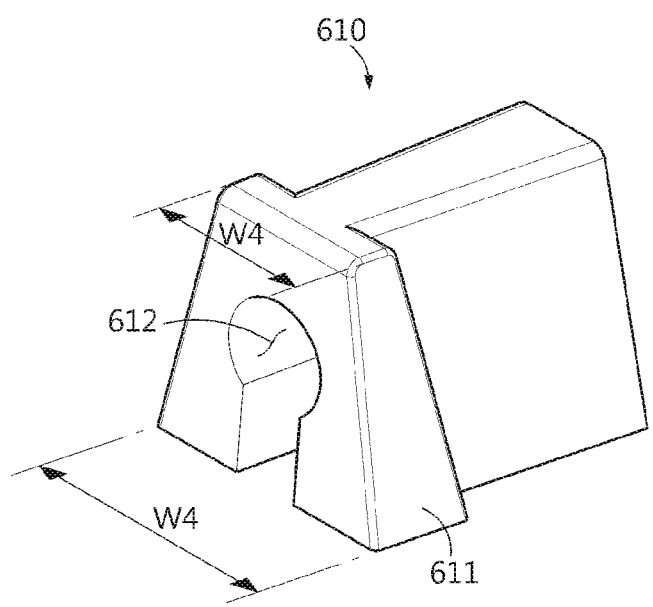
FIG. 20 is a perspective view showing a block body of the detachable block member, in the container having an attachable/detachable handle according to the fourth embodiment of the present disclosure.
Figure 21:
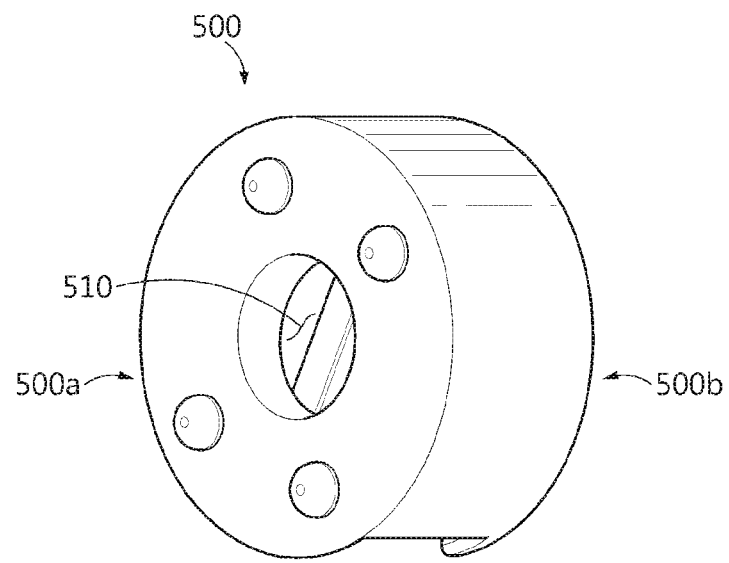
FIG. 21 is a perspective view showing one side of the fastening member, in the container having an attachable/detachable handle according to the fourth embodiment of the present disclosure.
Figure 22:
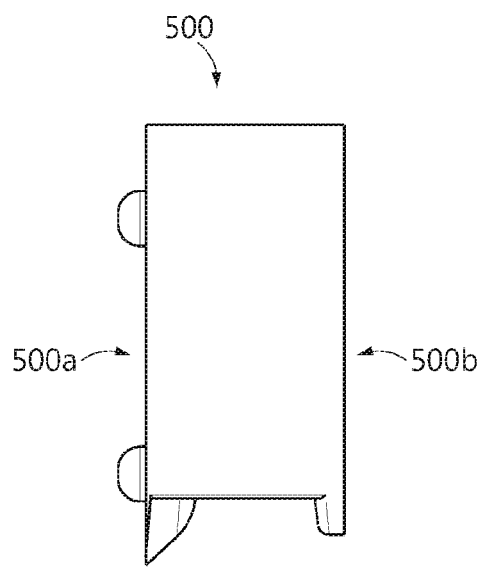
FIG. 22 is a side view showing the fastening member, in the container having an attachable/detachable handle according to the fourth embodiment of the present disclosure.
Figure 23:
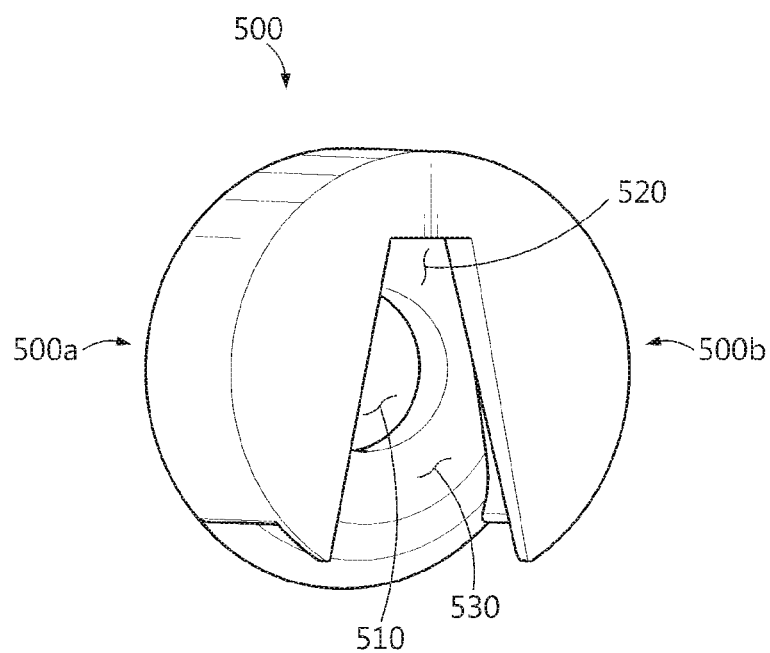
FIG. 23 is a perspective view showing the other side of the fastening member, in the container having an attachable/detachable handle according to the fourth embodiment of the present disclosure.

FIG. 17 is a perspective view showing an overall container having an attachable/detachable handle according to the fourth embodiment of the present disclosure, in which the fastening member is coupled to the handle, FIG. 18 is a side sectional view of FIG. 17, FIG. 19 is a perspective view showing a handle body, in the container having an attachable/detachable handle according to the fourth embodiment of the present disclosure, FIG. 20 is a perspective view showing a block body of the detachable block member, in the container having an attachable/detachable handle according to the fourth embodiment of the present disclosure, FIG. 21 is a perspective view showing one side of the fastening member, in the container having an attachable/detachable handle according to the fourth embodiment of the present disclosure, FIG. 22 is a side view showing the fastening member, in the container having an attachable/detachable handle according to the fourth embodiment of the present disclosure, and FIG. 23 is a perspective view showing the other side of the fastening member, in the container having an attachable/detachable handle according to the fourth embodiment of the present disclosure.

Hereinafter, the operation and effect of the container 10 (see FIGS. 1 and 2) including the attachable/detachable handle 20 according to the fourth embodiment of the present disclosure will be described with reference to the drawings. However, the features identical to those of the container 10 including the attachable/detachable handle 20 according to the first to third embodiments of the present disclosure will not be described in detail, and different features will be described in detail.

In the fourth embodiment of the present disclosure, unlike the first to third embodiments where the space 216 and the coupling groove 217 are formed in the detachable block member 200, a coupling groove 520 and a space 530 are formed in the fastening member 500 (see FIG. 23). In addition, the block body 610 has a different shape, and also the gap of the coupling groove 520 gradually increases from an upper side to a lower side, different from the first to third embodiments.

Referring to FIG. 21, the fastening member 500 has a fastening groove 510 formed at one side 500a of the fastening member 500 fixedly coupled to the container. In addition, referring to FIG. 23, a coupling groove 520 is formed at the other side 500b that is opposite to one side 500a. Here, a predetermined space 530 is formed between one side 500a of the fastening member 500 and the other side 500b of the fastening member 500. The protrusion 611 of the block body 610 is inserted into the space 530 of the fastening member 500, and at this time, the block body 610 is coupled to the coupling groove 520 of the fastening member 500. Here, the coupling groove 520 of the fastening member 500 may be shaped such that its separated gap gradually increases from an upper side to a lower side based on FIG. 23 (see FIG. 23), and the protrusion 611 of the block body 610 may be shaped such that its width w4 gradually increases from the upper side to the lower side to correspond to the coupling groove 520 (see FIG. 20). The stopper member 630 of the detachable block member 600 may be detachably fastened to the fastening groove 510 formed at one side 500a of the fastening member 500 (see FIG. 18), and this is already described in the first to third embodiments. In the fastening member 500, one side 500a (see FIGS. 21 and 22) of the fastening member 500 is fixedly coupled to the container 10 (see FIGS. 1 and 17), and the coupling groove 520 is exposed out of the container 10 at an opposite side of the fastening groove 510 (see FIGS. 22 and 23). In addition, the attachable/detachable handle 20 is detachably coupled to the fastening member 500.

The detachable block member 600 may be detachably fastened to the fastening groove 510 of the fastening member 500. Referring to FIG. 18, the detachable block member 600 may include a block body 610, an elastic member 620, a stopper member 630, and a lever 640. Hereinafter, the detachable block member 600 will be described in detail.

Referring to FIG. 20, the block body 610 includes a protrusion 611 inserted into the space 530 of the fastening member 500, has a perforated hole 612 into which the elastic member 620 and the stopper member 630 may be inserted, and is coupled to the coupling groove 520 of the fastening member 500. The perforated hole 612 is already described above in relation to the perforated hole 219 in the first to third embodiments. If the user moves the attachable/detachable handle 20 from the lower side to the upper side of the container to which the fastening member 500 is attached while holding the handle body 700 of the attachable/detachable handle 20, the protrusion 611 of the block body 610 is inserted into the space 530 of the fastening member 500, and the block body 610 is coupled to the coupling groove 520 of the fastening member 500 (see FIGS. 17 and 18). Here, the process in which the stopper member 630 is fastened to the fastening groove 510 is already described in the first to thirds embodiment.

Meanwhile, the elastic member 620, the stopper member 630, and the lever 640 are already described above in relation to the elastic member 220, the stopper member 230, and the lever 240 of the first to third embodiments. In addition, the handle body 700 (see FIG. 19) to which the detachable block member 600 is coupled is also already described above in relation to the handle of in the first to third embodiments.

Figure 24:
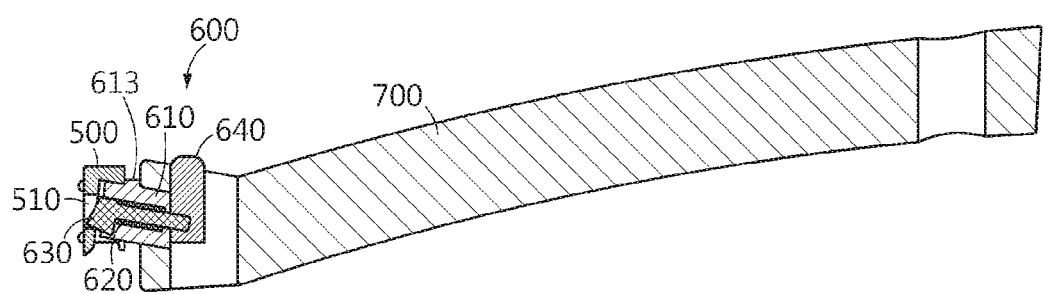
FIG. 24 is a side sectional view showing that the fastening member is coupled to the handle, in a container having an attachable/detachable handle according to the fifth embodiment of the present disclosure.
Figure 25:
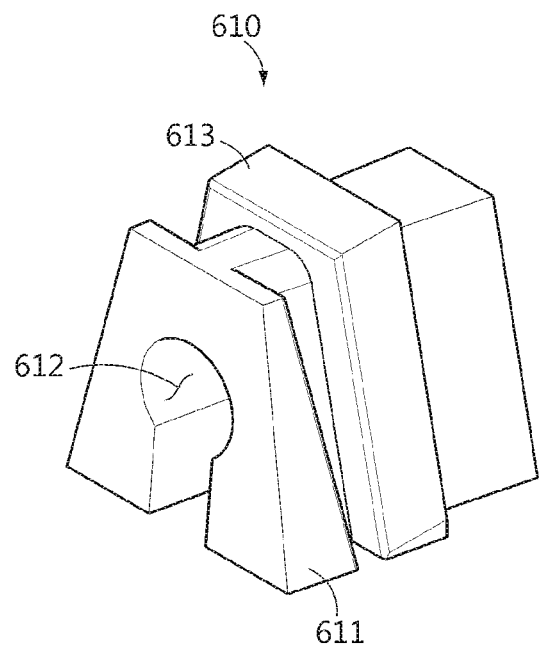
FIG. 25 is a perspective view showing a block body of the detachable block member, in the container having an attachable/detachable handle according to the fifth embodiment of the present disclosure.

FIG. 24 is a side sectional view showing that the fastening member is coupled to the handle, in a container having an attachable/detachable handle according to the fifth embodiment of the present disclosure, and FIG. 25 is a perspective view showing a block body of the detachable block member, in the container having an attachable/detachable handle according to the fifth embodiment of the present disclosure.

Hereinafter, the operation and effect of the container 10 including the attachable/detachable handle 20 according to the fifth embodiment of the present disclosure will be described with reference to the drawings. However, the features identical to those of the container 10 including the attachable/detachable handle 20 according to the first to fourth embodiments of the present disclosure will not be described in detail, and different features will be described in detail.

The fifth embodiment of the present disclosure is basically identical to the fourth embodiment, but has a difference in that the shape of the block body 610 of the detachable block member 600 is different from that of the fourth embodiment.

Referring to FIGS. 24 and 25, a guide portion 613 is further provided in the block body 610 of the fifth embodiment. Here, the guide portion 613 separates the front surface of the block body 610 from the fastening member 500 by a predetermined gap. That is, referring to FIG. 18 showing the fourth embodiment, the front surface of the block body 610 is in contact with the fastening member 500, but referring to FIG. 24 showing the fifth embodiment, the front surface of the block body 610 is spaced apart from the fastening member 500 by the guide portion 613. Thus, the fifth embodiment differs from the fourth embodiment.

Figure 27:
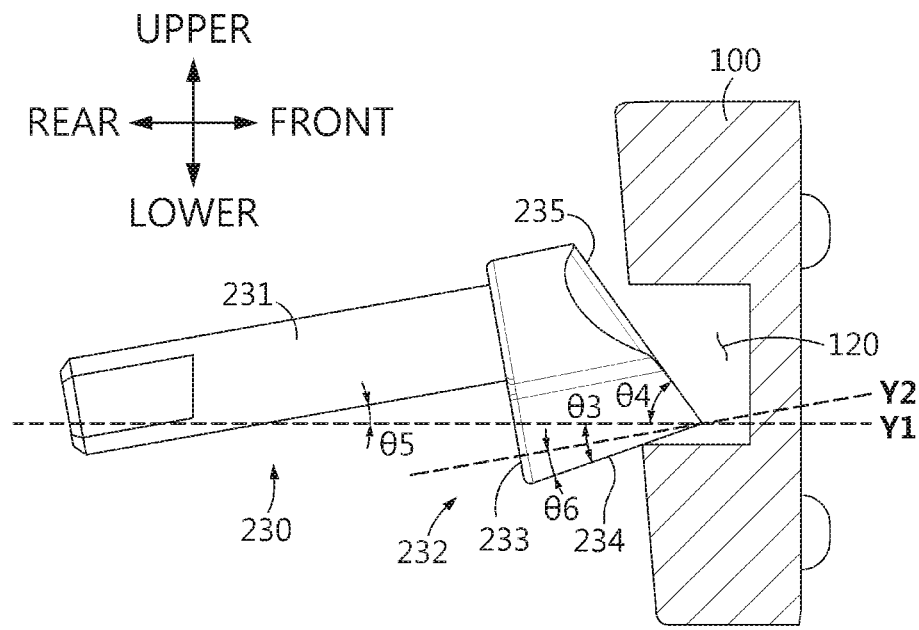
FIG. 27 is side view showing that the stopper member is coupled to the fastening groove of the fastening member, in a container having an attachable/detachable handle according to the sixth embodiment of the present disclosure.

FIG. 27 is side view showing that the stopper member is coupled to the fastening groove of the fastening member, in a container having an attachable/detachable handle according to the sixth embodiment of the present disclosure, and FIGS. 28 to 30 are diagrams for illustrating a process in which the stopper member is coupled to the fastening groove of the fastening member, in the container having an attachable/detachable handle according to the sixth embodiment of the present disclosure.

Hereinafter, the operation and effect of the container 10 (see FIGS. 1 and 2) including the attachable/detachable handle 20 according to the sixth embodiment of the present disclosure will be described with reference to the drawings. However, the features identical to those of the former embodiments of the present disclosure will not be described in detail, and different features will be described in detail.

In the sixth embodiment of the present disclosure, the second portion 234 and the third portion 235 are inclined based on a virtual horizontal line Y1 (see FIG. 27), different from the first embodiment in which the second portion 234 and the third portion 235 are inclined based on the moving shaft 231.

Referring to FIG. 27, the stopper member 230 is fastened to the fastening portion, namely to the fastening groove 120, to be inclined with respect to the virtual horizontal line Y1, and for this, the stopper member 230 may include a moving shaft 231 and a head 232. The moving shaft 231 is formed in a longitudinal direction, and here, the moving shaft 231 may be inserted into the perforated hole 219 formed in the block body 210 to be coupled to the lever 240. This feature is already described above in the first embodiment. Meanwhile, the elastic member 220 may be inserted into the perforated hole 219 of the block body 210, as in FIG. 12. Alternatively, in another embodiment, one side of the elastic member 200 may be coupled to the lever 240, and the other side of the elastic member 200 may be coupled to the block body 210.

Referring to FIG. 13, the perforated hole 219 of the block body 210 may be configured to be inclined based on the virtual horizontal line h1 that is orthogonal to the peripheral surface of the container 10, and the moving shaft 231 may be inserted along the inclined perforated hole 219. That is, the moving shaft 231 may be disposed to be inclined by $\theta 5$ based on the virtual horizontal line Y1 of FIG. 27 and inserted into the perforated hole 219 of the block body 210. This feature is identical to the first embodiment described above and thus will not be described again.

Referring to FIG. 27, the head 232 may include a first portion 233, a second portion 234, and a third portion 235. The first portion 233 is coupled to the moving shaft 231 and is disposed at the rear based on FIG. 27. Also, as shown in FIG. 27, the first portion 233 may be coupled to the moving shaft 231 so that the first portion 233 and the moving shaft 231 intersect each other. The first portion 233 may be coupled to the moving shaft 231 so that the first portion 233 and the moving shaft 231 may have various angles therebetween, for example so that the first portion 233 is orthogonal to the moving shaft 231. The second portion 234 is a portion extending from the first portion 233 and is disposed at the side based on FIG. 27, and may contact one side of the fastening groove 120, for example a lower side of the fastening groove 120 based on FIG. 27. As in FIG. 27, the second portion 234 may be inclined with respect to the virtual horizontal line Y1. In addition, the third portion 235 is a portion extending from the second portion 234 and may be disposed at the front based on FIG. 27. Here, the third portion 235 may contact the other side of the fastening groove 120, for example the upper side of the fastening groove 120 based on FIG. 27, or may be separated from the upper side of the fastening groove 120. That is, since the attachable/detachable handle 20 may be fixed when the second portion 234 comes into contact with the fastening groove 120, the third portion 235 may contact the fastening groove 120 or may be separated from the fastening groove 120 without contacting the fastening groove 120. In addition, the third portion 235 may also be inclined with respect to the virtual horizontal line Y1 like the second portion 234. Here, referring to FIG. 27, the inclination of the second portion 234 and the inclination of the third portion 235 with respect to the virtual horizontal line Y1 may be formed such that a first angle $\theta 3$ formed between the second portion 234 and the virtual horizontal line Y1 may be smaller than a second angle $\theta$ formed between the third portion 235 and the virtual horizontal line Y1 based on the acute angle. If the second portion 234 and the third portion 235 are inclined based on the virtual horizontal line Y1 as described above, after the second portion 234 of the head 232 of the stopper member 230 comes into contact with the fastening groove 120, it is possible to prevent movement in upper and lower directions based on FIG. 27. That is, the container 10 including the attachable/detachable handle 20 according to the first embodiment of the present disclosure may remove or reduce processing errors or clearances because the second portion 234 and the third portion 235 of the head 232 are inclined with respect to the virtual horizontal line Y1, thereby preventing the attachable/detachable handle 20 from moving in upper and lower directions based on FIG. 27. That is, the head 232 may be accurately contacted and fastened to the fastening groove 120 without clearance.

Referring to FIG. 27, the first angle $\theta 3$ may be formed downward with respect to the virtual horizontal line Y1, and the second angle $\theta 4$ may be formed upward with respect to the virtual horizontal line Y1.

Meanwhile, the second portion 234 may be formed to be inclined downward rather than the moving shaft 231 with respect to the moving shaft 231. For example, as shown in FIG. 27, the second portion 234 may be inclined downward by $\theta 6$ with respect to a virtual dotted line Y2 parallel to the moving shaft 231. However, the second portion 234 may be formed to be inclined upward rather than the moving shaft 231 with respect to the moving shaft 231.

Referring to FIG. 28, the second portion 234 of the head 232 moves upward while in contact with the fastening member 100. Referring to FIG. 29, if the second portion 234 of the head 232 moves upward, the head 232 is momentarily separated from the fastening member 100. In addition, referring to FIG. 30, the second portion 234 of the head 232 comes into contact with the lower side of the fastening groove 120 while the head 232 moves toward the fastening member 100 by the elastic force of the elastic member 620. In addition, the head 232 continues to move along the inclined surface of the second portion 234 while the second portion 234 of the head 232 is in contact with the lower side of the fastening groove 120, and the head 232 stops by coming into contact with at least one of the detachable block member 200 and the fastening groove 120. Accordingly, the attachable/detachable handle 20 may be fixed without movement.

Meanwhile, the features described in the sixth embodiment of the present disclosure may be applied to the first to fifth embodiments of the present disclosure as necessary to the extent applicable.

Figure 31:
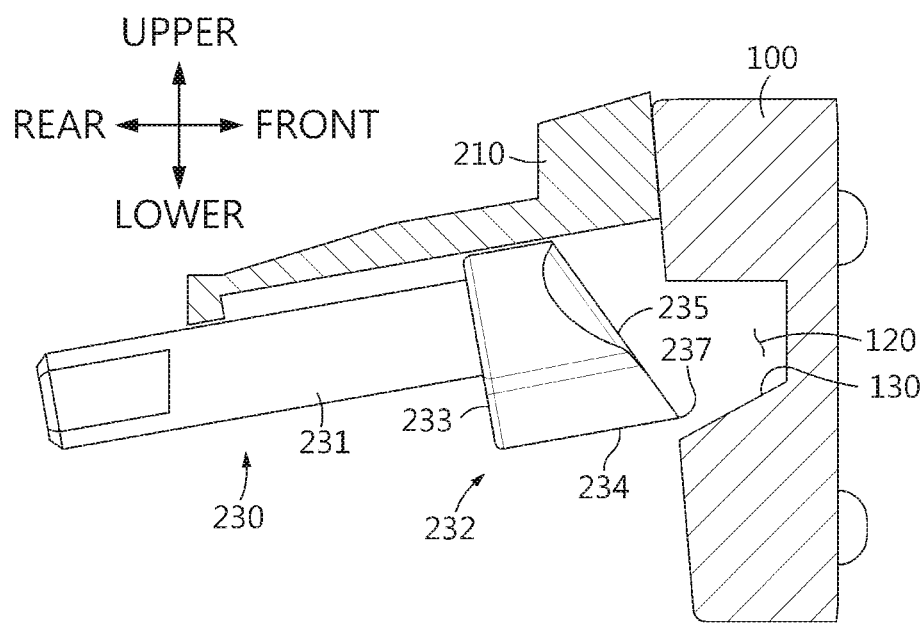
FIGS. 31 and 32 are diagrams showing that a head of the stopper member moves along an inclined portion of the fastening member, in a container having an attachable/detachable handle according to the seventh embodiment of the present disclosure.
Figure 32:
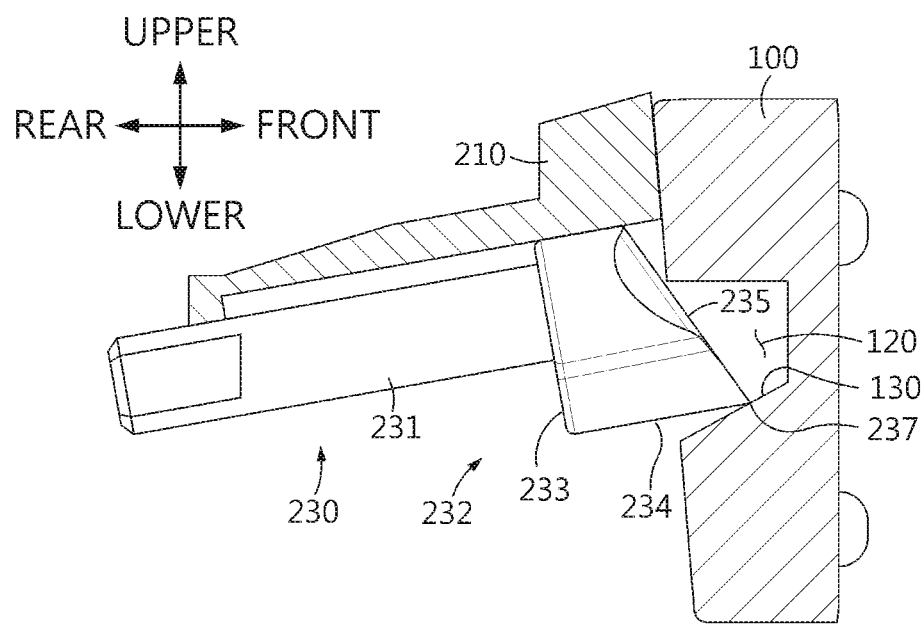

FIGS. 31 and 32 are diagrams showing that a head of the stopper member moves along an inclined portion of the fastening member, in a container having an attachable/detachable handle according to the seventh embodiment of the present disclosure.

Hereinafter, the operation and effect of the container 10 (see FIGS. 1 and 2) including the attachable/detachable handle 20 according to the seventh embodiment of the present disclosure will be described with reference to the drawings. However, the features identical to those of the former embodiments of the present disclosure will not be described in detail, and different features will be described in detail.

In the seventh embodiment of the present disclosure, the inclined portion 130 is formed at the fastening member 100, and the head 232 of the stopper member 230 moves along the inclined portion 130 of the fastening member 100, different from the first to sixth embodiments.

Referring to FIG. 31, the inclined portion 130 is formed at the fastening member 100. In addition, the head 232 may move along the inclined portion 130 while being in contact with the inclined portion 130 of the fastening member 100. Here, the second portion 234 may be formed parallel to the moving shaft 231. That is, the second portion 234 is not inclined with respect to the moving shaft 231. However, this does not mean that the case where the second portion 234 is inclined with respect to the moving shaft 231 is excluded. That is, even in the seventh embodiment, the second portion 234 may be inclined with respect to the moving shaft 231. Here, the head 232 may be in contact with the inclined portion 130 at a connection point 237 where the second portion 234 and the third portion 235 of the head 232 meet (see FIG. 32). In addition, if the moving shaft 231 is moved by the elastic force of the elastic member 620, the connection point 237 moves along the inclined portion 130 of the fastening member 100 while in contact with the inclined portion 130 of the fastening member 100. In addition, the head 232 is stopped in contact with at least one of the block body 210 of the detachable block member 200 and the upper side of the fastening groove 120. The process where the head 232 is stopped is identical to the former embodiment and thus will not be described again.

Figure 33:
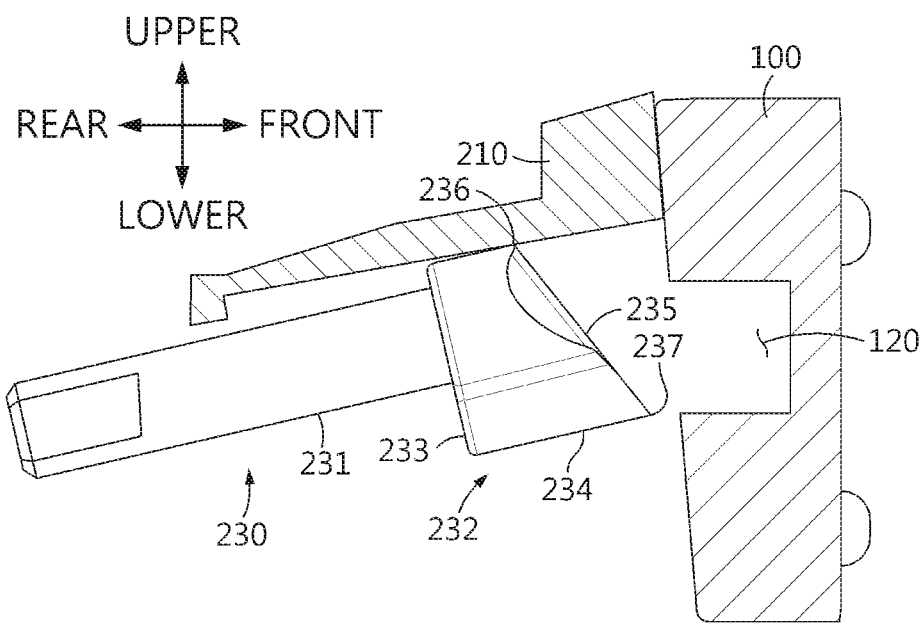
FIGS. 33 and 34 are diagrams showing that the head of the stopper member is coupled to the fastening member, in a container having an attachable/detachable handle according to the eighth embodiment of the present disclosure.
Figure 34:
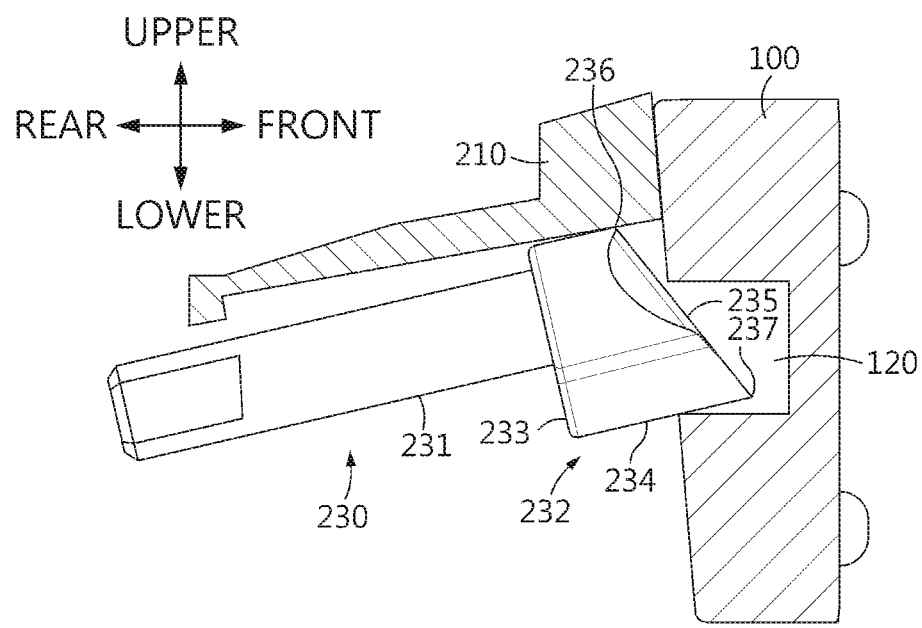

FIGS. 33 and 34 are diagrams showing that the head of the stopper member is coupled to the fastening member, in a container having an attachable/detachable handle according to the eighth embodiment of the present disclosure.

Hereinafter, the operation and effect of the container 10 (see FIGS. 1 and 2) including the attachable/detachable handle 20 according to the eighth embodiment of the present disclosure will be described with reference to the drawings. However, the features identical to those of the former embodiments of the present disclosure will not be described in detail, and different features will be described in detail.

In the eighth embodiment of the present disclosure, the head 232 comes into contact with the detachable block member 200 first, rather than the fastening member 100, and moves, different from the other embodiments.

Referring to FIGS. 33 and 34, the head 232 includes a fourth portion 236 coupled to the first portion 233. The fourth portion 236 may be a portion directly coupled to the first portion 233, or may be a portion indirectly coupled thereto by another portion or other members. Referring to FIG. 33, the fourth portion 236 of the head 232 moves in a state of contacting the block body 210 of the detachable block member 200 first, and referring to FIG. 34, the second portion 234 of the head 232 may be provided to stop by contacting the lower side of the fastening groove 120. Here, the fourth portion 236 of the head 232 may be in contact with the block body 210 of the detachable block member 200 at various positions, and, for example, as shown in FIG. 33, may be provided to contact the block body 210 of the detachable block member 200 at a point where the fourth portion 236 and the third portion 235 meet.

Figure 35:
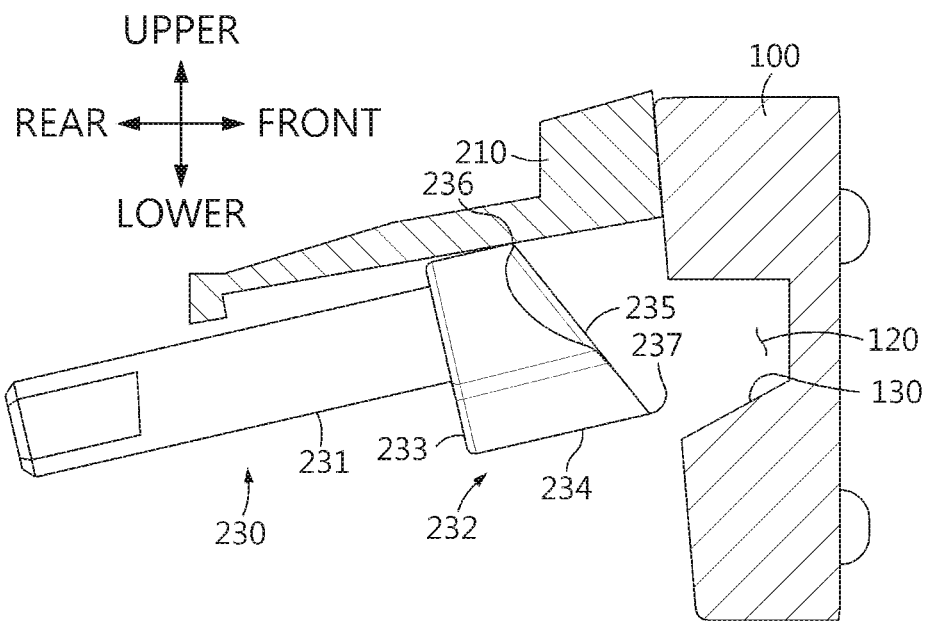
FIGS. 35 and 36 are diagrams showing that the head of the stopper member is coupled to the fastening member, in a container having an attachable/detachable handle according to the ninth embodiment of the present disclosure.
Figure 36:
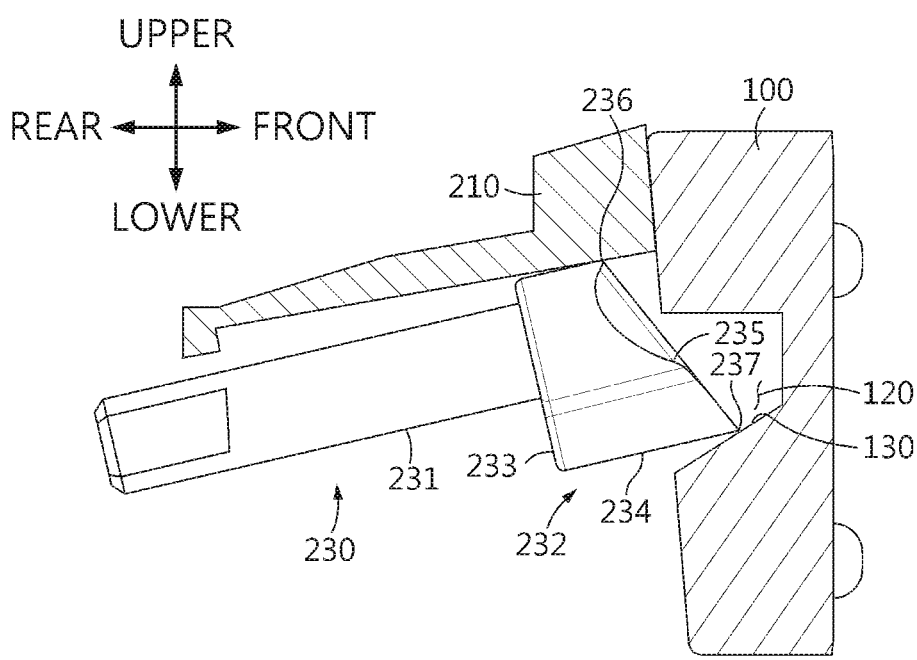

FIGS. 35 and 36 are diagrams showing that the head of the stopper member is coupled to the fastening member, in a container having an attachable/detachable handle according to the ninth embodiment of the present disclosure.

Hereinafter, the operation and effect of the container 10 (see FIGS. 1 and 2) including the attachable/detachable handle 20 according to the ninth embodiment of the present disclosure will be described with reference to the drawings. However, the features identical to those of the former embodiments of the present disclosure will not be described in detail, and different features will be described in detail.

In the ninth embodiment of the present disclosure, the head 232 comes into contact with the detachable block member 200 first, rather than the fastening member 100, and moves, different from the first to seventh embodiments, and the inclined portion 130 is formed at the fastening member 100, different from the eighth embodiment.

Referring to FIGS. 35 and 36, the head 232 includes a fourth portion 236 coupled to the first portion 233. The fourth portion 236 may be a portion directly coupled to the first portion 233, or may be a portion indirectly coupled thereto by another portion or other members. In addition, an inclined portion 130 is formed at the fastening member 100. Referring to FIG. 35, the fourth portion 236 of the head 232 moves while contacting the block body 210 of the detachable block member 200 first, and referring to FIG. 36, may be provided to stop by contacting another portion of the head 232, for example the inclined portion 130 of the fastening member 100 at the connection point 237 where the second portion 234 and the third portion 235 of the head 232 meet.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a container having an attachable/detachable handle and is particularly applicable to industries related to a container having an attachable/detachable handle.

What is claimed is:

1. A container having an attachable/detachable handle, comprising:
a fastening member comprising a first side coupled to a container and a fastening portion formed at a second side thereof that is opposite to the first side;
a detachable block member comprising a stopper member detachably coupled to the fastening portion of the fastening member; and
a handle body to which the detachable block member is coupled,
wherein the stopper member includes:
a moving shaft formed in a longitudinal direction and configured to be movable; and
a head coupled to the moving shaft,
wherein the head includes:
a first portion coupled to the moving shaft; and
a second portion coupled to the first portion and configured to contact the fastening portion, and
wherein the head is configured to move together with the moving shaft to contact the fastening portion,
wherein the second portion of the head comprises an inclined external surface inclined with respect to the moving shaft, and
wherein the inclined external surface of the second portion of the head is configured to move while contacting the fastening portion of the fastening member so that an extension line of a lower side of the fastening portion intersects an extension line of the second portion of the head, and then stop.

2. The container according to claim 1, wherein the second portion is formed to be inclined downwardly with respect to the moving shaft.

3. The container according to claim 1, wherein the head is configured to stop by contacting at least one of a non-head portion of the detachable block member or the fastening member.

4. The container according to claim 1, wherein the head includes a third portion coupled to the second portion, and wherein the third portion is inclined with respect to the moving shaft.

5. The container according to claim 4, wherein a first angle formed between the second portion and the moving shaft is formed downward with respect to the moving shaft, and wherein a second angle formed between the third portion and the moving shaft is formed upward with respect to the moving shaft.

6. The container according to claim 5, wherein based on an acute angle, the first angle is smaller than the second angle.

7. The container according to claim 1, wherein the first portion and the moving shaft are coupled to intersect each other.

8. The container according to claim 1, wherein the detachable block member includes:
a block body having a space in which the fastening member is inserted, the block body having a perforated hole formed therein;
an elastic member inserted into the perforated hole of the block body; and
a lever coupled to the stopper member, and
wherein the stopper member is inserted into the perforated hole and coupled to the elastic member to receive an elastic force and is fastened to the fastening portion formed in the fastening member.

9. The container according to claim 8, wherein the perforated hole is inclined on a virtual horizontal line orthogonal to a peripheral surface of the container, and wherein the moving shaft is inserted along the inclined perforated hole.

10. The container according to claim 1, wherein the detachable block member includes:
a block body having a space in which the fastening member is inserted, the block body having a perforated hole formed therein;
an elastic member coupled to the block body; and
a lever coupled to the stopper member and the elastic member, and
wherein the stopper member is inserted into the perforated hole and coupled to the lever to receive an elastic force from the elastic member coupled to the lever and is fastened to the fastening portion formed in the fastening member.

11. The container according to claim 1, wherein the fastening member has an inclined portion, and wherein the head is configured to move along the inclined portion in contact with the inclined portion of the fastening member and then stop.

12. The container according to claim 11, wherein the head is configured to move along the inclined portion of the fastening member while contacting the inclined portion of the fastening member and then stop by contacting at least one of a non-head portion of the detachable block member or the fastening member.

13. The container according to claim 11, wherein the head includes a third portion coupled to the second portion, wherein the second portion and the third portion meet at a connection point, and wherein the connection point is configured to move along the inclined portion of the fastening member while contacting the inclined portion of the fastening member.

14. The container according to claim 1, wherein the head includes a third portion coupled to the second portion, and a fourth portion coupled to the first non-head portion, wherein the head is configured to move while the fourth portion of the head contacts a portion of the detachable block member first and stop as the second portion of the head contacts the fastening portion.

15. The container according to claim 1, wherein the head includes a third portion coupled to the second portion, and a fourth portion coupled to the first portion, wherein the fastening member includes an inclined portion, wherein the head is configured to move while the fourth portion of the head contacts a non-head portion of the detachable block member first and stop as another portion of the head contacts the inclined portion of the fastening member.

16. The container according to claim 1, wherein the inclined external surface is configured to be inclined with respect to the lower side of the fastening portion while contacting the fastening portion.

17. The container according to claim 1, wherein the fastening portion comprises a fastening groove configured to only partially receive the head of the stopper member.

18. A container having an attachable/detachable handle, comprising:
a fastening member comprising a fastening portion formed at a first side thereof and a coupling groove formed at a second side thereof that is opposite to the first side, the fastening member comprising a predetermined space formed between the first side and the second side, wherein the first side is fixedly coupled to a container;
a detachable block member comprising a stopper member detachably coupled to the fastening portion of the fastening member; and
a handle body to which the detachable block member is coupled,
wherein the stopper member includes:
 a moving shaft formed in a longitudinal direction and configured to be movable; and
 a head coupled to the moving shaft,
wherein the head includes:
 a first portion coupled to the moving shaft; and
 a second portion coupled to the first portion and configured to contact the fastening portion, and
wherein the head is configured to move together with the moving shaft to contact the fastening portion,
wherein the second portion of the head comprises an inclined external surface inclined with respect to the moving shaft, and
wherein the inclined external surface of the second portion of the head is configured to move while contacting the fastening portion of the fastening member so that an extension line of a lower side of the fastening portion intersects an extension line of the second portion of the head, and then stop.

19. The container according to claim 18, wherein the detachable block member includes:
a block body having a protrusion inserted into the space of the fastening member and having a perforated hole formed therein, the block body being coupled to the coupling groove;
an elastic member inserted into the perforated hole of the block body;
a stopper member inserted into the perforated hole and coupled to the elastic member to receive an elastic force and fastened to the fastening portion formed in the fastening member; and
a lever coupled to the stopper member.

20. The container according to claim 18, wherein the coupling groove is formed such that a separated gap thereof gradually increases from an upper side to a lower side.

21. The container according to claim 18, wherein the protrusion is formed to have a width gradually increasing from an upper side to a lower side to correspond to the coupling groove.

* * * * *